(12) United States Patent
Lin

(10) Patent No.: US 12,255,982 B2
(45) Date of Patent: Mar. 18, 2025

(54) SECURED PERFORMANCE OF A CRYPTOGRAPHIC PROCESS

(71) Applicant: Irdeto B.V., Hoofddorp (NL)

(72) Inventor: Tingting Lin, Hoofddorp (NL)

(73) Assignee: IRDETO B.V., Hoofddorp (NL)

( * ) Notice: Subject to any disclaimer, the term of this patent is extended or adjusted under 35 U.S.C. 154(b) by 228 days.

(21) Appl. No.: 17/895,583

(22) Filed: Aug. 25, 2022

(65) Prior Publication Data

US 2023/0082339 A1  Mar. 16, 2023

(30) Foreign Application Priority Data

Aug. 26, 2021 (EP) ..................................... 21193193

(51) Int. Cl.
*H04L 29/06* (2006.01)
*H04L 9/06* (2006.01)

(52) U.S. Cl.
CPC ...... *H04L 9/0631* (2013.01); *H04L 2209/043* (2013.01); *H04L 2209/16* (2013.01)

(58) Field of Classification Search
CPC ............. H04L 9/0631; H04L 2209/043; H04L 2209/16; H04L 9/003
See application file for complete search history.

(56) References Cited

U.S. PATENT DOCUMENTS

| | | | |
|---|---|---|---|
| 6,816,968 B1 * | 11/2004 | Walmsley | G06F 21/77 713/168 |
| 7,502,464 B2 * | 3/2009 | Macchetti | H04L 9/0631 380/37 |

FOREIGN PATENT DOCUMENTS

| | | | | |
|---|---|---|---|---|
| WO | WO-9103113 A1 * | 3/1991 | | |
| WO | WO-0108012 A1 * | 2/2001 | ............. | G06F 21/72 |

OTHER PUBLICATIONS

EP Appl No. 21193193.6-1218, European Search Report, dated Feb. 17, 2022.

(Continued)

*Primary Examiner* — Shawnchoy Rahman
(74) *Attorney, Agent, or Firm* — James J. DeCarlo; Greenberg Traurig, LLP

(57) ABSTRACT

A method of performing a cryptographic process in a secured manner, wherein the cryptographic process generates output data based on input data, the generating of the output data involving generating a value y based on an amount of data x, the value y representing a combination, according to a linear transformation L, of respective outputs from a plurality of S-boxes $S_n$ (n=0, ..., N−1) for integer N>1, wherein each S-box $S_n$ (n=0, ..., N−1) implements a respective function $H_n$ that is either (a) the composition of a respective first function $F_n$ and a respective linear or affine second function $G_n$ so that $H_n = G_n \circ F_n$, or (b) the composition of a respective first function $F_n$, a respective linear or affine second function $G_n$ and a respective third function $W_n$ so that $H_n = G_n \circ F_n \circ W_n$, wherein the method comprises: performing a first processing stage and a second processing stage to generate the value y based on the amount of data x, wherein: the first processing stage uses a plurality of first lookup tables to generate respective outputs, each output being based on at least part of the amount of data x, wherein, for each S-box $S_n$ (n=0, ..., N−1), the respective first function $F_n$ is implemented by a corresponding first lookup table; and the second processing stage combines outputs from a plurality of second lookup tables to generate the value y, wherein the input to each second lookup table is formed from the output of a plurality of the first lookup tables, and wherein the set of second lookup tables is based on the second functions $G_n$ (n=0, ..., N−1) and the linear transformation L.

20 Claims, 9 Drawing Sheets

(56) References Cited

OTHER PUBLICATIONS

Kunpeng Bai et al: "A secure white-box SM4 implementation", Security and Communication Networks, vol. 9, No. 10, Jul. 10, 2016 (Jul. 10, 2016), pp. 996-1006.
Yang Shi et al: "A lightweight white-box symmetric encryption algorithm against node capture for WSNs", 2014 IEEE Wireless Communications and Networking Conference (WCNC), IEEE, Apr. 6, 2014 (Apr. 6, 2014), pp. 3058-3063.
Yatao Yang et al: "WBCD: White-box Block Cipher Scheme Based on Dynamic Library", IACR, International Association for Cryptologic Research, vol. 20201006:093407 Oct. 1, 2020 (Oct. 1, 2020), pp. 1-27.
Federal Information Processing Standards Publication 197; Announcing the Advanced Encryption Standard (AES); Nov. 26, 2001; 51 pages.
S-Box; Wikipedia; Jul. 15, 2021; 3 pages; https://en.wikipedia.org/w/index.php?title=S-box&oldid=1033801501.
Substitution-permutation network; Wikipedia; Mar. 30, 2021; 3 pages; https://en.wikipedia.org/w/index.php?title=Substitution-permutation_network&oldid=1015125189.

* cited by examiner

SECURED PERFORMANCE OF A CRYPTOGRAPHIC PROCESS

FIELD OF THE INVENTION

The present invention relates to methods and systems for performing a cryptographic process in a secured manner and for generating a secured implementation of a cryptographic process.

BACKGROUND OF THE INVENTION

"White-box" cryptography is a known topic in cryptography. In white-box attacks, a cryptographic scheme is assumed to execute on an untrusted platform and a white-box adversary is assumed to have full control over the internal details of the execution. A white-box environment is, therefore, an execution environment for an item of software in which an attacker of the item of software is assumed to have full access to, and visibility of, the data being operated on (including intermediate values), memory contents and execution/process flow of the item of software. Moreover, in the white-box environment, the attacker is assumed to be able to modify the data being operated on, the memory contents and the execution/process flow of the item of software, for example by using a debugger—in this way, the attacker can experiment on, and try to manipulate the operation of, the item of software, with the aim of circumventing initially intended functionality and/or identifying secret information and/or for other purposes. Indeed, one may even assume that the attacker is aware of the underlying algorithm being performed by the item of software. However, the item of software may need to use secret information (e.g. one or more cryptographic keys), where this information needs to remain hidden from the attacker.

Under white-box attacks, many traditional cryptographic schemes cannot provide protection for private information. White-box cryptography aims at providing robustness of the implementations of cryptographic systems and constructing cryptographic systems that can succeed in their functionality (such as encryption, decryption and authentication) under white-box attacks.

White-box attacks are becoming more diversified and powerful. This enables the adversary to conduct many attacks (both static and dynamic). For example, grey-box attacks such as DPA (Differential Power Analysis) have been repurposed under the name DCA (Differential Computation Analysis) and are directly usable against white-box implementations. The main reason that DCA is successful is due to the nonnegligible correlation between expected values (from the standard cipher specification) and corresponding masked intermediate values (from the white-box implementation). Such correlation is often caused by linear imbalances in encodings used in some white-box implementation.

In many cryptographic processes (such as encryption and decryption algorithms), S-boxes (or substitution boxes) are used as a nonlinear component that is often critical for confusion. S-boxes are well-known—see, for example, https://en.wikipedia.org/wiki/S-box, the entire disclosure of which is incorporated herein by reference. In most white-box implementations, a cryptographic key will be hidden in one or more S-boxes. Therefore, the issue of how to protect the S-boxes is something that needs to be considered in order to have a secured implementation of the cryptographic process. Some protections are proven to be weak under white-box attacks, especially DCA attacks—this includes use of affine transformation, networked encoding, mask injection, etc. Common to these protections is that the statistic distribution of inputs affects the statistic distribution of outputs and there is nonnegligible correlation between the expected values and the masked intermediate values.

SUMMARY OF THE INVENTION

Embodiments of the invention aim to address such problems, using an improved/secured implementation of S-boxes.

According to a first aspect of the invention, there is provided a method of performing a cryptographic process in a secured manner, wherein the cryptographic process generates output data based on input data, the generating of the output data involving generating a value y based on an amount of data x, the value y representing a combination, according to a linear transformation L, of respective outputs from a plurality of S-boxes $S_n$ (n=0, . . . , N−1) for integer N>1, wherein each S-box $S_n$ (n=0, . . . , N−1) implements a respective function $H_n$ that is either (a) the composition of a respective first function $F_n$ and a respective linear or affine second function $G_n$ so that $H_n = G_n \circ F_n$, or (b) the composition of a respective first function $F_n$, a respective linear or affine second function $G_n$ and a respective third function $W_n$ so that $H_n = G_n \circ F_n \circ W_n$, wherein the method comprises: performing a first processing stage and a second processing stage to generate the value y based on the amount of data x, wherein: the first processing stage uses a plurality of first lookup tables to generate respective outputs, each output being based on at least part of the amount of data x, wherein, for each S-box $S_n$ (n=0, . . . , N−1), the respective first function $F_n$ is implemented by a corresponding first lookup table; and the second processing stage combines outputs from a plurality of second lookup tables to generate the value y, wherein the input to each second lookup table is formed from the output of a plurality of the first lookup tables, and wherein the set of second lookup tables is based on the second functions $G_n$ (n=0, . . . , N−1) and the linear transformation L.

According to a second aspect of the invention, there is provided a method of generating a secured implementation of a cryptographic process, wherein the cryptographic process generates output data based on input data, the generating of the output data involving generating a value y based on an amount of data x, the value y representing a combination, according to a linear transformation L, of respective outputs from a plurality of S-boxes $S_n$ (n=0, . . . , N−1) for integer N>1, wherein each S-box $S_n$ (n=0, . . . , N−1) implements a respective function $H_n$ that is either (a) the composition of a respective first function $F_n$ and a respective linear or affine second function $G_n$ so that $H_n = G_n \circ F_n$, or (b) the composition of a respective first function $F_n$, a respective linear or affine second function $G_n$ and a respective third function $W_n$ so that $H_n = G_n \circ F_n \circ W_n$, wherein the method comprises: implementing a first processing stage and a second processing stage that, together, are arranged to generate the value y based on the amount of data x, wherein: implementing the first processing stage comprises generating a plurality of first lookup tables that provide respective outputs, each output being based on at least part of the amount of data x, wherein, for each S-box $S_n$ (n=0, . . . , N−1), the respective first function $F_n$ is implemented by a corresponding first lookup table; and implementing the second processing stage comprises generating a plurality of second lookup tables, the second processing stage arranged to combine outputs from the plurality of second lookup tables to generate the value y, wherein the input to each second lookup table is formed from the output of a plurality of the first lookup tables, and wherein the set of second lookup tables is based on the second functions $G_n$ (n=0, . . . , N−1) and the linear transformation L.

In some embodiments of the first and second aspects, the outputs of the first lookup tables have a larger bit width than the inputs to the first lookup tables.

In some embodiments of the first and second aspects, the first lookup tables implement a corresponding obfuscation transformation that is undone by the plurality of second lookup tables.

In some embodiments of the first and second aspects, the output of each first lookup table being based on at least part of the amount of data x comprises the output of each first lookup table being based on a corresponding portion of bits of the amount of data x.

In some embodiments of the first and second aspects, the output of each first lookup table comprises the sum of a respective plurality of components, and wherein the input to each second lookup table is formed from one or more respective components of each of said plurality of the first lookup tables.

According to a third aspect of the invention, there is provided a system arranged to perform a cryptographic process in a secured manner, wherein the cryptographic process generates output data based on input data, the generating of the output data involving generating a value y based on an amount of data x, the value y representing a combination, according to a linear transformation L, of respective outputs from a plurality of S-boxes $S_n$ (n=0, . . . , N−1) for integer N>1, wherein each S-box $S_n$ (n=0, . . . , N−1) implements a respective function $H_n$ that is either (a) the composition of a respective first function $F_n$ and a respective linear or affine second function $G_n$ so that $H_n=G_n \circ F_n$, or (b) the composition of a respective first function $F_n$, a respective linear or affine second function $G_n$ and a respective third function $W_n$ so that $H_n=G_n \circ F_n \circ W_n$, wherein the system comprises one or more processors configure to: perform a first processing stage and a second processing stage to generate the value y based on the amount of data x, wherein: the first processing stage uses a plurality of first lookup tables to generate respective outputs, each output being based on at least part of the amount of data x, wherein, for each S-box $S_n$ (n=0, . . . , N−1), the respective first function $F_n$ is implemented by a corresponding first lookup table; and the second processing stage combines outputs from a plurality of second lookup tables to generate the value y, wherein the input to each second lookup table is formed from the output of a plurality of the first lookup tables, and wherein the set of second lookup tables is based on the second functions $G_n$ (n=0, . . . , N−1) and the linear transformation L.

According to a fourth aspect of the invention, there is provided a system arranged to generate a secured implementation of a cryptographic process, wherein the cryptographic process generates output data based on input data, the generating of the output data involving generating a value y based on an amount of data x, the value y representing a combination, according to a linear transformation L, of respective outputs from a plurality of S-boxes $S_n$ (n=0, . . . , N−1) for integer N>1, wherein each S-box $S_n$ (n=0, . . . , N−1) implements a respective function $H_n$ that is either (a) the composition of a respective first function $F_n$ and a respective linear or affine second function $G_n$ so that $H_n=G_n \circ F_n$, or (b) the composition of a respective first function $F_n$, a respective linear or affine second function $G_n$ and a respective third function $W_n$ so that $H_n=G_n \circ F_n \circ W_n$, wherein the system comprises one or more processors arranged to: implement a first processing stage and a second processing stage that, together, are arranged to generate the value y based on the amount of data x, wherein: implementing the first processing stage comprises generating a plurality of first lookup tables that provide respective outputs, each output being based on at least part of the amount of data x, wherein, for each S-box $S_n$ (n=0, . . . , N−1), the respective first function $F_n$ is implemented by a corresponding first lookup table; and implementing the second processing stage comprises generating a plurality of second lookup tables, the second processing stage arranged to combine outputs from the plurality of second lookup tables to generate the value y, wherein the input to each second lookup table is formed from the output of a plurality of the first lookup tables, and wherein the set of second lookup tables is based on the second functions $G_n$ (n=0, . . . , N−1) and the linear transformation L.

In some embodiments of the third and fourth aspect, the outputs of the first lookup tables have a larger bit width than the inputs to the first lookup tables.

In some embodiments of the third and fourth aspect, the first lookup tables implement a corresponding obfuscation transformation that is undone by the plurality of second lookup tables.

In some embodiments of the third and fourth aspect, the output of each first lookup table being based on at least part of the amount of data x comprises the output of each first lookup table being based on a corresponding portion of bits of the amount of data x.

In some embodiments of the third and fourth aspect, the output of each first lookup table comprises the sum of a respective plurality of components, and wherein the input to each second lookup table is formed from one or more respective components of each of said plurality of the first lookup tables.

According to a fifth aspect of the invention, there is provided a computer program which, when executed by one or more processors, causes the one or more processors to carry out the method of the first or second aspect (or any embodiment thereof). The computer program may be stored on a computer readable medium.

BRIEF DESCRIPTION OF THE DRAWINGS

Embodiments of the invention will now be described, by way of example only, with reference to the accompanying drawings, in which.

DETAILED DESCRIPTION OF EMBODIMENTS OF THE INVENTION

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

1—System Overview

Figure 1:
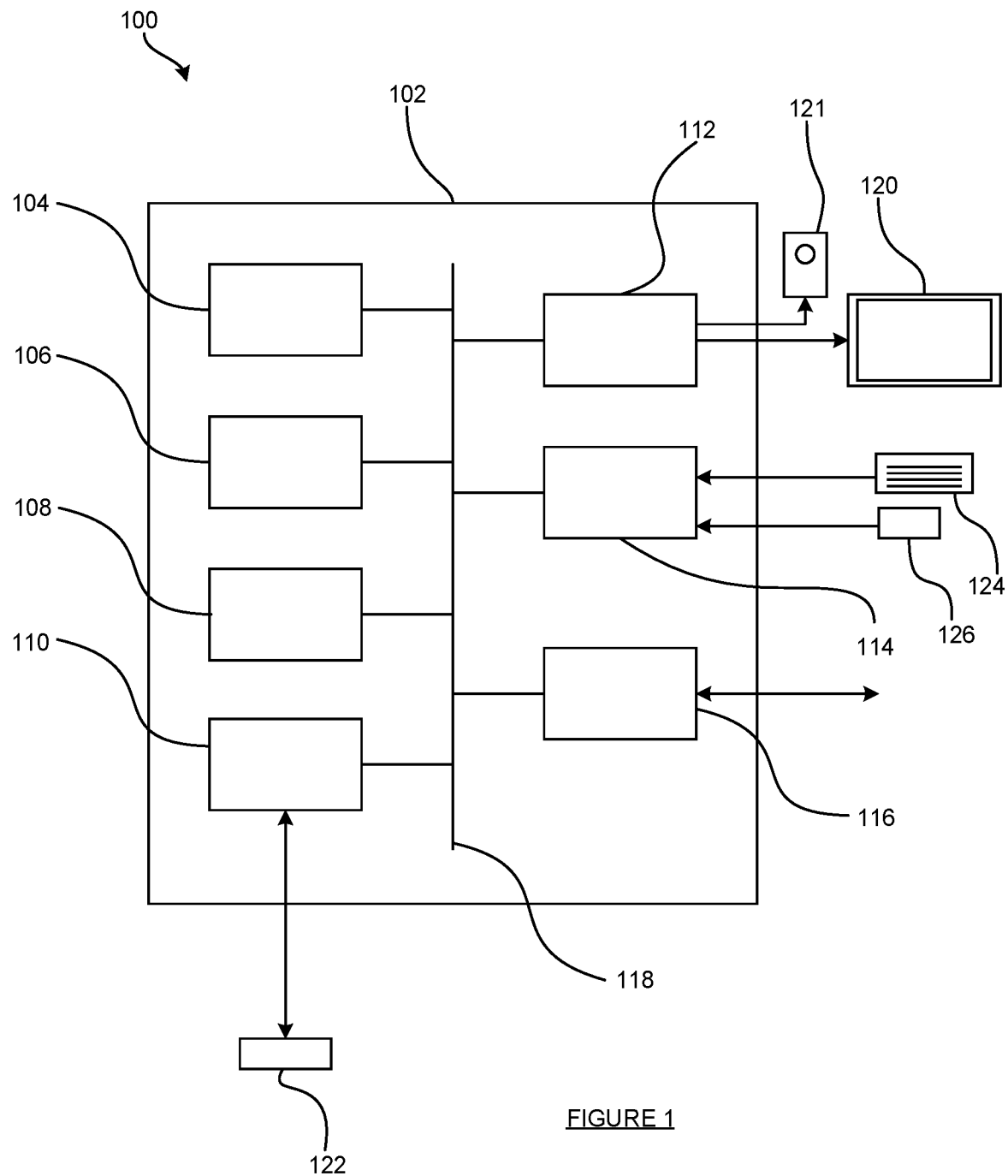
FIG. 1 schematically illustrates an example of a computer system.

FIG. 1 schematically illustrates an example of a computer system 100. The system 100 comprises a computer 102. The computer 102 comprises: a storage medium 104, a memory 106, a processor 108, an interface 110, a user output interface 112, a user input interface 114 and a network interface 116, which may be linked together over one or more communication buses 118.

The storage medium 104 may be any form of non-volatile data storage device such as one or more of a hard disk drive, a magnetic disc, a solid-state-storage device, an optical disc, a ROM, etc. The storage medium 104 may store an operating system for the processor 108 to execute in order for the computer 102 to function. The storage medium 104 may also store one or more computer programs (or software or instructions or code).

The memory 106 may be any random access memory (storage unit or volatile storage medium) suitable for storing data and/or computer programs (or software or instructions or code).

The processor 108 may be any data processing unit suitable for executing one or more computer programs (such as those stored on the storage medium 104 and/or in the memory 106), some of which may be computer programs according to embodiments of the invention or computer programs that, when executed by the processor 108, cause the processor 108 to carry out a method according to an embodiment of the invention and configure the system 100 to be a system according to an embodiment of the invention. The processor 108 may comprise a single data processing unit or multiple data processing units operating in parallel, separately or in cooperation with each other. The processor 108, in carrying out data processing operations for embodiments of the invention, may store data to and/or read data from the storage medium 104 and/or the memory 106.

The interface 110 may be any unit for providing an interface to a device 122 external to, or removable from, the computer 102. The device 122 may be a data storage device, for example, one or more of an optical disc, a magnetic disc, a solid-state-storage device, etc. The device 122 may have processing capabilities—for example, the device may be a smart card. The interface 110 may therefore access data from, or provide data to, or interface with, the device 122 in accordance with one or more commands that it receives from the processor 108.

The user input interface 114 is arranged to receive input from a user, or operator, of the system 100. The user may provide this input via one or more input devices of the system 100, such as a mouse (or other pointing device) 126 and/or a keyboard 124, that are connected to, or in communication with, the user input interface 114. However, it will be appreciated that the user may provide input to the computer 102 via one or more additional or alternative input devices (such as a touch screen). The computer 102 may store the input received from the input devices via the user input interface 114 in the memory 106 for the processor 108 to subsequently access and process, or may pass it straight to the processor 108, so that the processor 108 can respond to the user input accordingly.

The user output interface 112 is arranged to provide a graphical/visual and/or audio output to a user, or operator, of the system 100. As such, the processor 108 may be arranged to instruct the user output interface 112 to form an image/video signal representing a desired graphical output, and to provide this signal to a monitor (or screen or display unit) 120 of the system 100 that is connected to the user output interface 112. Additionally or alternatively, the processor 108 may be arranged to instruct the user output interface 112 to form an audio signal representing a desired audio output, and to provide this signal to one or more speakers 121 of the system 100 that is connected to the user output interface 112.

Finally, the network interface 116 provides functionality for the computer 102 to download data from and/or upload data to one or more data communication networks.

It will be appreciated that the architecture of the system 100 illustrated in FIG. 1 and described above is merely exemplary and that other computer systems 100 with different architectures (for example with fewer components than shown in FIG. 1 or with additional and/or alternative components than shown in FIG. 1) may be used in embodiments of the invention. As examples, the computer system 100 could comprise one or more of: a personal computer; a server computer; a mobile telephone; a tablet; a laptop; a television set; a set top box; a games console; other mobile devices or consumer electronics devices; etc. Additionally, it is possible that some components of the computer system 100 are not located in the computer 102 and are, instead, part of a computer network connected to the computer 102 via the network interface 116. Additionally or alternatively, the computer system 100 may comprise multiple computers 102, e.g. in a network of computers such as a cloud system of computing resources.

2—Secured Implementation of Cryptographic Processes and S-Boxes

The SM4 encryption and decryption algorithms are well-known—details of SM4 can be found at http://www.gmbz.org.cn/upload/2018-04-04/1522788048733065051.pdf, the entire disclosure of which is incorporated herein by reference.

SM4 encryption operates on a 128-bit input $d_{In}$ and produces a corresponding 128-bit encrypted output $d_{Out}$ using a 128-bit encryption key. SM4 encryption involves performing a round 32 times—the input to the first round (round 0) is $d_{In}$, and the input to the $(r+1)^{th}$ round is the output of the preceding $r^{th}$ round (for r=0, 1, . . . , 30). The $r^{th}$ round (for r=0, 1, . . . , 31) makes use of a corresponding 32-bit round key $k_r$ that is derived from the 128-bit encryption key using a key expansion algorithm.

Figure 2A:
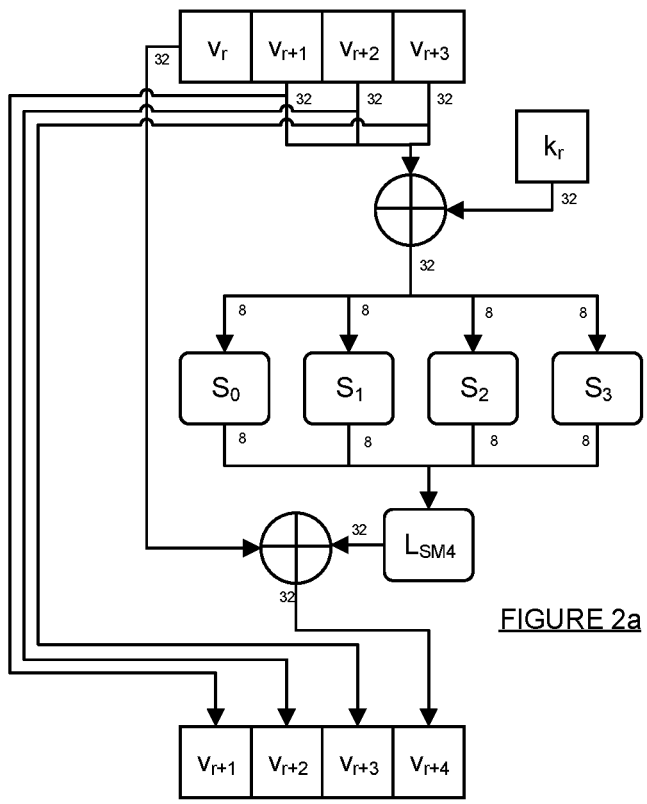
FIGS. 2a and 2b schematically illustrate an overview of the $r^{th}$ round for SM4 encryption.

FIG. 2a schematically illustrates an overview of the $r^{th}$ round for SM4 encryption (for r=0, 1, . . . , 31). In summary:
- The 128-bit input to the $r^{th}$ round comprises, or is treated as a concatenation of, four 32-bit quantities (or values): $v_r$, $v_{r+1}$, $v_{r+2}$, $v_{r+3}$.
- The 32-bit round key $k_r$ and the 32-bit quantities $v_{r+1}$, $v_{r+2}$, $v_{r+3}$ are XOR-ed together.
- The result of this XOR is a 32-bit quantity that comprises, or is treated as a concatenation of, four 8-bit quantities (or values). Each of these four 8-bit quantities is used as an input to an S-box to obtain a corresponding output 8-bit quantity. In FIG. 2a, the S-box is shown as being implemented four times in parallel, as respective S-boxes ($S_0$, $S_1$, $S_2$, $S_3$) so that the four 8-bit quantities can be provided as inputs to their own respective S-box.

The four 8-bit quantities (or values) that are output by the S-boxes are combined by a linear transformation $L_{SM4}$ to generate a 32-bit quantity (or value).

The 32-bit quantity generated by the linear transformation $L_{SM4}$ is XOR-ed with $v_r$ to produce a 32-bit quantity $v_{r+4}$.

The output of the round is then the 128-bit value that comprises, or is a concatenation of, the four 32-bit quantities $v_{r+1}$, $v_{r+2}$, $v_{r+3}$, $v_{r+4}$.

The output of the last round is, therefore, the four 32-bit quantities $v_{32}$, $v_{33}$, $v_{34}$, $v_{35}$. The 128-bit encrypted output $d_{Out}$ is formed by reversing the order of these four 32-bit quantities, i.e. the 128-bit quantity represented by the concatenation of $v_{35}$, $v_{34}$, $v_{33}$, $v_{32}$.

SM4 decryption may be implemented similarly, as is well-known.

The S-boxes $S_0$, $S_1$, $S_2$, $S_3$ for SM4 encryption each implement the lookup table set out in Table 1 below. In particular, for an 8-bit input with hexadecimal representation $\alpha\beta$, the corresponding 8-bit value that is output/provided by the S-box is as per Table 1 below.

TABLE 1

| | | β | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | A | B | C | D | E | F |
| α | 0 | D6 | 90 | E9 | FE | CC | E1 | 3D | B7 | 16 | B6 | 14 | C2 | 28 | FB | 2C | 5 |
| | 1 | 2B | 67 | 9A | 76 | 2A | BE | 4 | C3 | AA | 44 | 13 | 26 | 49 | 86 | 6 | 99 |
| | 2 | 9C | 42 | 50 | F4 | 91 | EF | 98 | 7A | 33 | 54 | 0B | 43 | ED | CF | AC | 62 |
| | 3 | E4 | B3 | 1C | A9 | C9 | 8 | E8 | 95 | 80 | DF | 94 | FA | 75 | 8F | 3F | A6 |
| | 4 | 47 | 7 | A7 | FC | F3 | 73 | 17 | BA | 83 | 59 | 3C | 19 | E6 | 85 | 4F | A8 |
| | 5 | 68 | 6B | 81 | B2 | 71 | 64 | DA | 8B | F8 | EB | 0F | 4B | 70 | 56 | 9D | 35 |
| | 6 | 1E | 24 | 0E | 5E | 63 | 58 | D1 | A2 | 25 | 22 | 7C | 3B | 1 | 21 | 78 | 87 |
| | 7 | D4 | 0 | 46 | 57 | 9F | D3 | 27 | 52 | 4C | 36 | 2 | E7 | A0 | C4 | C8 | 9E |
| | 8 | EA | BF | 8A | D2 | 40 | C7 | 38 | B5 | A3 | F7 | F2 | CE | F9 | 61 | 15 | A1 |
| | 9 | E0 | AE | 5D | A4 | 9B | 34 | 1A | 55 | AD | 93 | 32 | 30 | F5 | 8C | B1 | E3 |
| | A | 1D | F6 | E2 | 2E | 82 | 66 | CA | 60 | C0 | 29 | 23 | AB | 0D | 53 | 4E | 6F |
| | B | D5 | DB | 37 | 45 | DE | FD | 8E | 2F | 3 | FF | 6A | 72 | 6D | 6C | 5B | 51 |
| | C | 8D | 1B | AF | 92 | BB | DD | BC | 7F | 11 | D9 | 5C | 41 | 1F | 10 | 5A | D8 |
| | D | 0A | C1 | 31 | 88 | A5 | CD | 7B | BD | 2D | 74 | D0 | 12 | B8 | E5 | B4 | B0 |
| | E | 89 | 69 | 97 | 4A | 0C | 96 | 77 | 7E | 65 | B9 | F1 | 9 | C5 | 6E | C6 | 84 |
| | F | 18 | F0 | 7D | EC | 3A | DC | 4D | 20 | 79 | EE | 5F | 3E | D7 | CB | 39 | 48 |

The S-box of Table 1 implements the S-box function $H(x) = (A_2((A_1(x \oplus C_1))^{-1})) \oplus C_2$, where $x$, $C_1$, $C_2 \in \mathbb{Z}_2^8$ (i.e. are represented by respective 8×1 vectors of bits), and $A_1$, $A_2$ are 8×8 matrices over $\mathbb{Z}_2$. It will be appreciated, of course, that there are other equivalent ways of mathematically representing the S-box function $H(x)$.

Figure 2B:
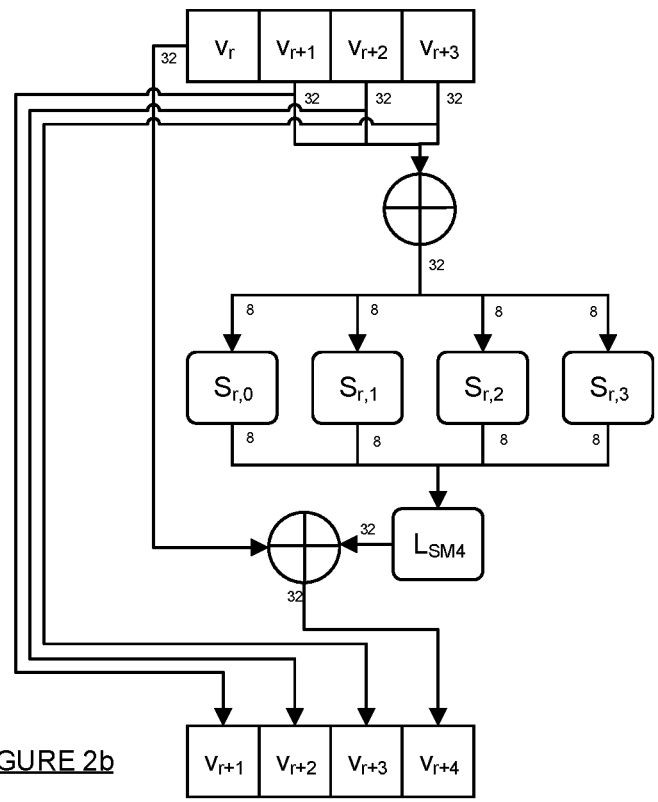

If the 32-bit round key $k_r$ is viewed as a concatenation of four 8-bit subkeys $k_{r,0}$, $k_{r,1}$, $k_{r,2}$, $k_{r,3}$, then each of the subkeys $k_{r,n}$ (n=0, 1, 2, 3) may be implemented as part of the corresponding S-box $S_n$. This results in four bespoke S-boxes for the $r^{th}$ round, namely $S_{r,n}$ (n=0, 1, 2, 3) that correspond, respectively, to the 8-bit subkeys $k_{r,n}$. In particular, for any 8-bit input x, the S-box $S_{r,n}$ generates an 8-bit output y that equals the output of the standard S-box for SM4 encryption when provided with the 8-bit input $x \oplus k_{r,n}$. Thus, the S-box $S_{r,n}$ implements the S-box function $H_{r,n}(x) = (A_2((A_1(x \oplus k_{r,n} \oplus C_1))^{-1})) \oplus C_2$. FIG. 2b schematically illustrates an overview of the $r^{th}$ round for SM4 encryption (for r=0, 1, ..., 31) when the round key $k_r$ has been combined with the S-boxes $S_0$, $S_1$, $S_2$, $S_3$, i.e. when the bespoke S-boxes $S_{r,n}$ (n=0, 1, 2, 3) are used instead of the S-boxes $S_0$, $S_1$, $S_2$, $S_3$.

The AES encryption and decryption algorithms are well-known—details of AES are given in Federal Information Processing Standards Publication 197 (found at http://csrc.nist.gov/publications/fips/fips197/fips-197.pdf), the entire disclosure of which is incorporated herein by reference.

AES encryption operates on a 128-bit input $d_{In}$ and produces a corresponding 128-bit encrypted output $d_{Out}$. There are three variations of AES, known as AES-128, AES-192 and AES-256: for AES-n, the size of the encryption key is n bits. AES encryption involves performing a round a number of times, R—for AES-128, R=10; for AES-192, R=12; for AES-256, R=14. A key expansion algorithm is used to generate R+1 128-bit subkeys $k_r$ (r=0, 1, ..., R). The $r^{th}$ round makes use of $k_r$ (r=1, 2, ..., R). The input to AES encryption is $d_{In}$, which gets XOR-ed with $k_0$, following which the sequence of R rounds (rounds 1, 2, ..., R) is performed.

Figure 3A:
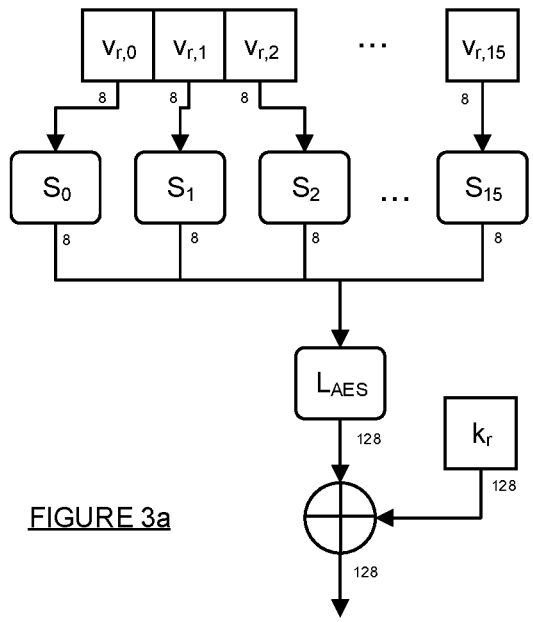
FIGS. 3a and 3b schematically illustrate an overview of the $r^{th}$ round for SM4 encryption.

FIG. 3a schematically illustrates an overview of the $r^{th}$ round for AES encryption (for r=1, 2, ..., R). In summary:

The 128-bit input to the $r^{th}$ round comprises, or is treated as a concatenation of, sixteen 8-bit quantities: $v_{r,0}$, $v_{r,1}$, ..., $v_{r,15}$.

Each of these sixteen 8-bit quantities $v_{r,0}$, $v_{r,1}$, ..., $v_{r,15}$ is used as an input to an S-box to obtain a corresponding output 8-bit quantity. In FIG. 3a, the S-box is shown as being implemented sixteen times in parallel, as respective S-boxes ($S_0$, $S_1$, ..., $S_{15}$) so that the sixteen 8-bit quantities $v_{r,0}$, $v_{r,1}$, ..., $v_{r,15}$ can be provided as inputs to their own respective S-box.

The sixteen 8-bit quantities that are output by the S-boxes are combined by a linear transformation $L_{AES}$ to generate a 128-bit value. For rounds 1, 2, ..., R−1, this linear transformation $L_{AES}$ comprises a so-called Shift-Rows function followed by so-called MixColumns operation; for the $R^{th}$ round, this linear transformation $L_{AES}$ comprises just the ShiftRows function.

The 128-bit value generated by the linear transformation $L_{AES}$ is XOR-ed with $k_r$ to produce a 128-bit output value for the round. The 128-bit encrypted output $d_{Out}$ is the 128-bit value output from the $R^{th}$ round.

AES decryption may be implemented similarly, as is well-known.

The S-boxes $S_0, S_1, \ldots S_{15}$ for AES encryption each implement the lookup table set out in Table 2 below. In particular, for an 8-bit input with hexadecimal representation $\alpha\beta$, the corresponding 8-bit value that is output/provided by the S-box is as per Table 2 below.

more than once (e.g. N times), with the N S-box outputs being provided from the plurality of implementations of the S-boxes—this is particularly true when the S-boxes are different for each S-box output, e.g. when a key (or a part thereof) has been combined with the S-box, as discussed

TABLE 2

|   |   | β |   |   |   |   |   |   |   |   |   |   |   |   |   |   |
|---|---|---|---|---|---|---|---|---|---|---|---|---|---|---|---|---|
|   |   | 0 | 1 | 2 | 3 | 4 | 5 | 6 | 7 | 8 | 9 | A | B | C | D | E | F |
| α | 0 | 63 | 7c | 77 | 7b | f2 | 6b | 6f | c5 | 30 | 1 | 67 | 2b | fe | d7 | ab | 76 |
|   | 1 | ca | 82 | c9 | 7d | fa | 59 | 47 | f0 | ad | d4 | a2 | af | 9c | a4 | 72 | C0 |
|   | 2 | b7 | fd | 93 | 26 | 36 | 3f | f7 | cc | 34 | a5 | e5 | f1 | 71 | d8 | 31 | 15 |
|   | 3 | 4 | c7 | 23 | c3 | 18 | 96 | 5 | 9a | 7 | 12 | 80 | e2 | eb | 27 | b2 | 75 |
|   | 4 | 9 | 83 | 2c | 1a | 1b | 6e | 5a | a0 | 52 | 3b | d6 | b3 | 29 | e3 | 2f | 84 |
|   | 5 | 53 | d1 | 0 | ed | 20 | fc | b1 | 5b | 6a | cb | be | 39 | 4a | 4c | 58 | cf |
|   | 6 | d0 | ef | aa | fb | 43 | 4d | 33 | 85 | 45 | f9 | 2 | 7f | 50 | 3c | 9f | a8 |
|   | 7 | 51 | a3 | 40 | 8f | 92 | 9d | 38 | f5 | be | b6 | da | 21 | 10 | ff | f3 | d2 |
|   | 8 | cd | 0c | 13 | ec | 5f | 97 | 44 | 17 | c4 | a7 | 7e | 3d | 64 | 5d | 19 | 73 |
|   | 9 | 60 | 81 | 4f | de | 22 | 2a | 90 | 88 | 46 | ee | b8 | 14 | de | 5e | 0b | db |
|   | A | e0 | 32 | 3a | 0a | 49 | 6 | 24 | 5c | c2 | d3 | ac | 62 | 91 | 95 | e4 | 79 |
|   | B | e7 | c8 | 37 | 6d | 8d | d5 | 4e | a9 | 6c | 56 | f4 | ea | 65 | 7a | ae | 8 |
|   | C | ba | 78 | 25 | 2e | 1c | a6 | b4 | c6 | e8 | dd | 74 | 1f | 4b | bd | 8b | 8a |
|   | D | 70 | 3e | b5 | 66 | 48 | 3 | f6 | 0e | 61 | 35 | 57 | b9 | 86 | c1 | 1d | 9e |
|   | E | e1 | f8 | 98 | 11 | 69 | d9 | 8e | 94 | 9b | 1e | 87 | e9 | ce | 55 | 28 | df |
|   | F | 8c | a1 | 89 | 0d | bf | e6 | 42 | 68 | 41 | 99 | 2d | 0f | b0 | 54 | bb | 16 |

The S-box of Table 2 implements the S-box function $H(x)=(A_1(x^{-1}))\oplus C_1$, where $x$, $C_1 \in \mathbb{Z}_2^8$ (i.e. are represented by respective 8×1 vectors of bits), and $A_1$ is an 8×8 matrix over $\mathbb{Z}_2$. It will be appreciated, of course, that there are other equivalent ways of mathematically representing the S-box function $H(x)$.

Figure 3B:
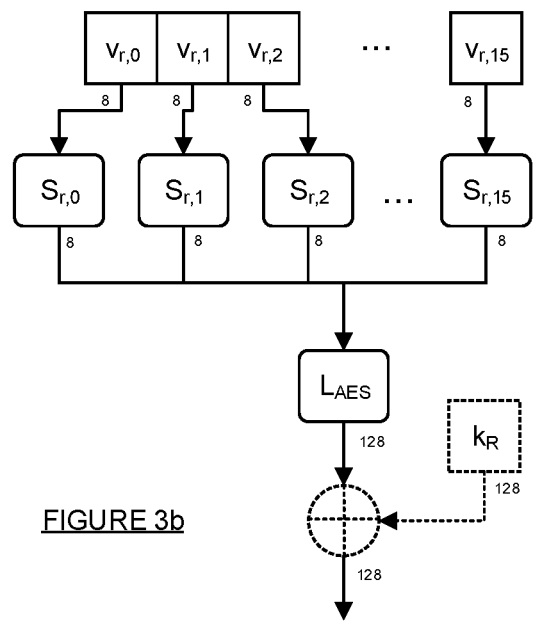

If the 128-bit subkey $k_{r-1}$ is viewed as a concatenation of sixteen 8-bit subkeys $k_{r-1,0}, k_{r-1,1}, \ldots, k_{r-1,15}$, ($r=1, 2, \ldots, R$), then each of the subkeys $k_{r-1,n}$ ($n=0, 1, \ldots, 15$) may be implemented as part of the corresponding S-box $S_n$ in the $r^{th}$ round. In other words, the initial XOR of the input $d_{In}$ with $k_0$ may be implemented as part of the S-boxes for round 1. Likewise, the XOR at the end of the $r^{th}$ round ($r=1, 2, \ldots, R-1$) may be implemented as part of the S-boxes for the following round, i.e. the $(r+1)^{th}$ round. This results in sixteen bespoke S-boxes for the $r^{th}$ round, namely $S_{r,n}$ ($n=0, 1, \ldots, 15$) that correspond, respectively, to the 8-bit subkeys $k_{r-1,n}$. In particular, for any 8-bit input $x$, the S-box $S_{r,n}$ generates an 8-bit output $y$ that equals the output of the standard S-box for AES encryption when provided with the 8-bit input $x \oplus k_{r-1,n}$. Thus, the S-box $S_{r,n}$ implements the S-box function $H_{r,n}(x)=(A_1((x \oplus k_{r-1,n})^{-1})) \oplus C_1$. FIG. 3b schematically illustrates an overview of the $r^{th}$ round for AES encryption (for $r=1, 2, \ldots, R$) when the subkey $k_{r-1}$ has been combined with the S-boxes $S_0, S_1, \ldots, S_{15}$, i.e. when the bespoke S-boxes $S_{r,n}$ ($n=0, 1, \ldots, 15$) are used instead of the S-boxes $S_0, S_1, \ldots, S_{15}$ (note that the XOR at the end of the round is only present for the final round, hence it is shown using dotted lines).

As can be seen from the above, SM4 encryption, SM4 decryption, AES encryption and AES decryption may be viewed as a cryptographic process that comprises generating output data $d_{Out}$ based on input data $d_{In}$. The generation of the output data involves generating an amount of data $y$ based on an amount of data $x$, the amount of data $y$ representing a combination, according to a linear transformation $L$, of $N$ S-box outputs for some integer $N>1$. In some implementations of such a cryptographic process, the S-box may be implemented once and used N times to provide the N S-box outputs; in other implementations of such a cryptographic process, the S-box may be implemented separately above. Regardless of the actual implementation, in the following this may be regarded as equivalent to using a plurality N of S-boxes $S_n$ ($n=0, 1, \ldots, N-1$) for integer $N>1$, wherein each S-box $S_n$ ($n=0, 1, \ldots, N-1$) implements a respective function $H_n$ (which may or may not be the same of the other functions $H_j$ for $j \neq n$). As illustrated above, the generation of an amount of data $y$ based on an amount of data $x$ occurs in each round of SM4 encryption, SM4 decryption, AES encryption and AES decryption, but it will be appreciated that this need not be the case for other cryptographic processes. It will be appreciated that embodiments of the invention are not limited to SM4 encryption/decryption or AES encryption/decryption as the cryptographic process, but that other algorithms could be used instead (such as Serpent encryption/decryption). Based on the above, it will be appreciated that embodiments of the invention are particularly suited to cryptographic processes that are, or that involve use of, a substitution-permutation network (such networks being well-known, and more details of which can be found at https://en.wikipedia.org/wiki/Substitution%E2%80%93permutation_network, the entire disclosure of which is incorporated herein by reference).

More generally, then, suppose there are N S-boxes $S_n$ ($n=0, 1, \ldots, N-1$), where N is an integer greater than 1. Each S-box $S_n$ ($n=0, 1, \ldots, N-1$) implements, or represents, an S-box function $H_n$, i.e. for each valid input x, for the S-box $S_n$, the corresponding output from the S-box $S_n$ is $H_n(x_n)$. Thus, the amount of data $x$ may comprise (or provide or represent) the inputs $x_n$ for the S-boxes $S_n$ ($n=0, 1, \ldots, N-1$), and the linear transformation $L$ may operates on the outputs $H_n(x_n)$ from the S-boxes $S_n$ ($n=0, 1, \ldots, N-1$) to generate the amount of data $y$. For example (e.g. as in the SM4 encryption and decryption and AES encryption and decryption discussed above), the inputs $x_n$ ($n=0, 1, \ldots, N-1$) may be formed from corresponding bits (e.g. blocks of consecutive bits) of the amount of data $x$.

Now, for each S-box $S_n$ ($n=0, 1, \ldots, N-1$), the corresponding S-box function $H_n$ may be represented as a composition of a corresponding first function $F_n$ and a corresponding second function $G_n$, so that $H_n = G_n \circ F_n$. In the following discussion and embodiments, the corresponding second function $G_n$ is an affine function/transformation or possibly a linear function/transformation. Indeed, the corresponding S-box function $H_n$ may be represented as a composition of more than two functions, which may be represented as a composition of a corresponding first function $F_n$, a corresponding second function $G_n$ and a corresponding third function $W_n$ so that $H_n=G_n \circ F_n \circ W_n$. If, on the face of it, the corresponding S-box function $H_n$ does not appear to be representable as a composition of two or more functions, then note that $H_n=G_n \circ (G_n^{-1} \circ H_n)$ for any affine (or possibly linear) function $G_n$ having the same codomain as $H_n$'s codomain—thus, the corresponding S-box function $H_n$ may be represented as a composition of a corresponding first function, namely $(G_n^{-1} \circ H_n)$, and a corresponding second function $G_n$.

Thus, each S-box $S_n$ (n=0, 1, ..., N−1) implements a respective function $H_n$ that is either (a) the composition of a respective first function $F_n$ and a respective second function $G_n$ so that $H_n=G_n \circ F_n$, or (b) the composition of a respective first function $F_n$, a respective second function $G_n$ and a respective third function $W_n$ so that $H_n=G_n \circ F_n \circ W_n$. It will be appreciated that, for any S-box function $H_n$, there may be multiple ways of writing $H_n$ as a composition of two or more functions.

For each S-box $S_n$ (n=0, 1, ..., N−1), the corresponding S-box function $H_n$ may be an algebraic function, but this is not essential. Likewise, the corresponding first function $F_n$ (and, where used, the corresponding third function $W_n$) may be algebraic functions, but this is not essential. As mentioned, the corresponding second function $G_n$ is an affine function/transformation (or possibly a linear function/transformation).

Figure 4A:
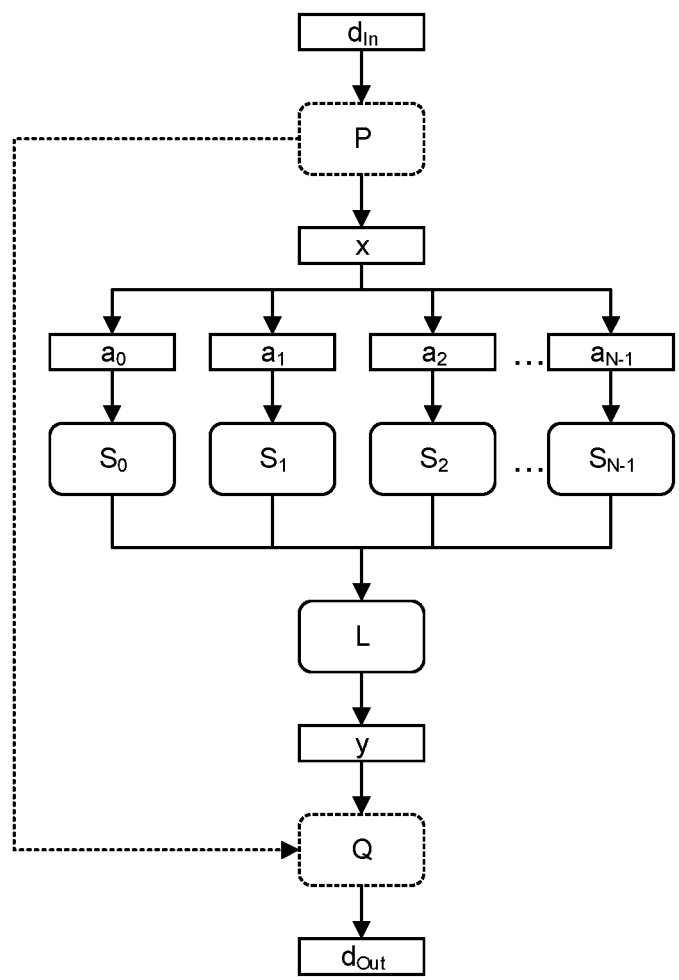
FIGS. 4a and 4b schematically illustrate a general scenario for a cryptographic process.
Figure 4B:
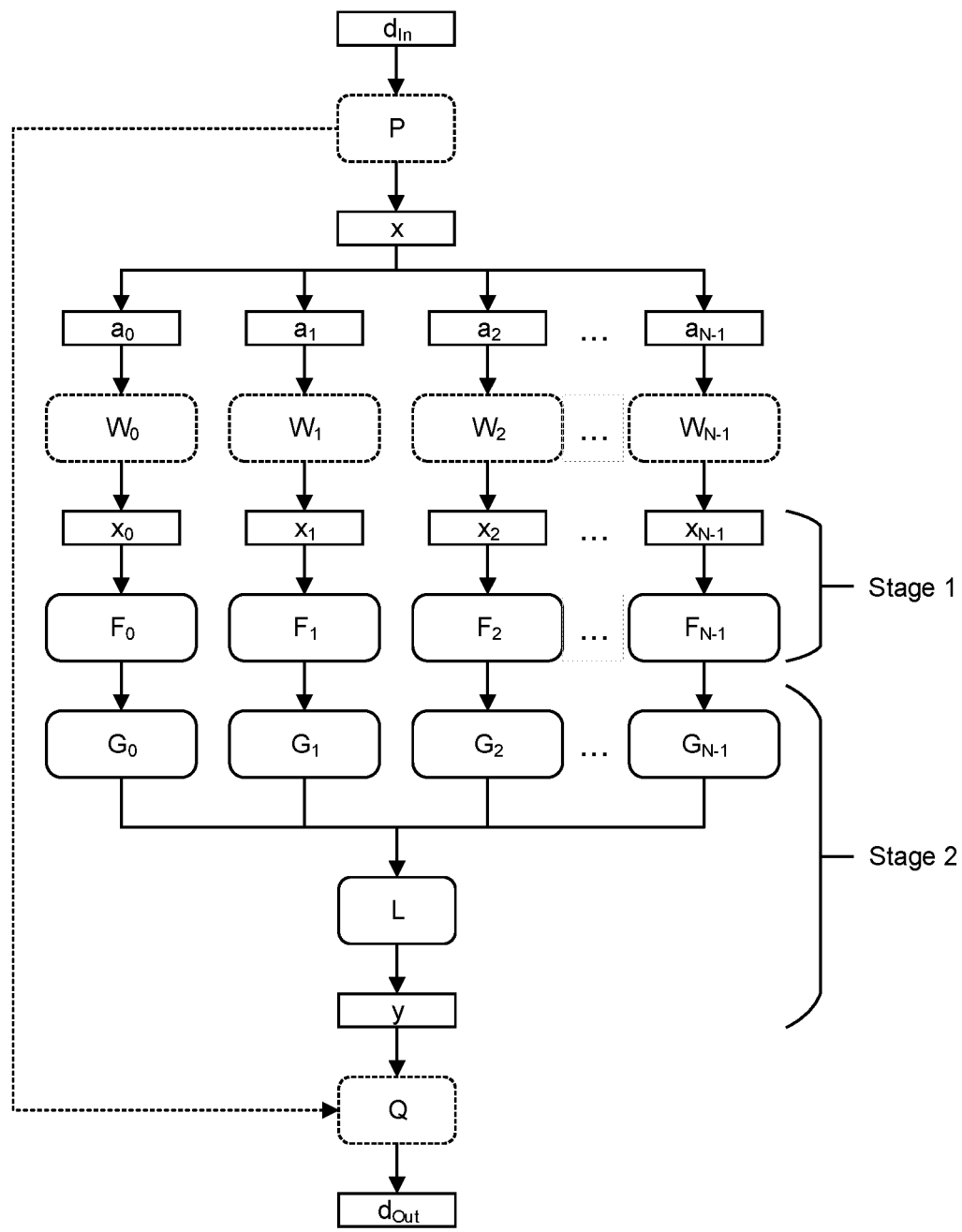

FIGS. 4a and 4b schematically illustrate the above-discussed general scenario. As shown in FIG. 4a, the cryptographic process generates output data $d_{Out}$ based on input data $d_{In}$. At some stage in the cryptographic process, the cryptographic process involves generating an amount of data (or value) y based on an amount of data (or value) x. There may be some processing P of the input data $d_{In}$ to arrive at the amount of data x; however, such processing P may be optional, so that $x=d_{In}$. Likewise, there may be some processing Q of the amount of data y (and note that the processing Q may additionally be based on other data generated by the processing P) to arrive at the output data $d_{Out}$; however, such processing Q may be optional, so that $d_{Out}=y$. The amount of data y represents a combination, according to a linear transformation L, of respective outputs from a plurality of S-boxes $S_n$ (n=0, 1, ..., N−1) where N>1. These outputs from the S-boxes $S_n$ (n=0, 1, ..., N−1) correspond to respective inputs (or amounts of data or values) $a_n$ for the S-boxes $S_n$, where $a_n$ is based on the amount of data x (e.g. is formed as, or comprises, one or more bits, or components of, the amount of data x).

FIG. 4b schematically illustrates the cryptographic process of FIG. 4a, but in which each of the S-boxes $S_n$ (n=0, 1, ..., N−1) implements the corresponding S-box function $H_n$ which can be written as either:

(a) a composition of a corresponding first function $F_n$ and a corresponding second function $G_n$, so that $H_n=G_n \circ F_n$—in this case, the input to the first function $F_n$ (n=0, 1, ..., N−1) is the value (or amount of data) $x_n$, where $x_n=a_n$; or (b) a composition of a corresponding first function $F_n$, a corresponding second function $G_n$ and a corresponding third function $W_n$, so that $H_n=G_n \circ F_n \circ W_n$—in this case, the input to the third function $W_n$ (n=0, 1, ..., N−1) is the value (or amount of data) $a_n$ and the input to the first function $F_n$ (n=0, 1, ..., N−1) is the value (or amount of data) $x_n=W_n(a_n)$.

As discussed, the third functions $W_n$ (n=0, 1, ..., N−1) are optional, hence they are shown in dotted lines in FIG. 4b. Additionally, it will be appreciated that in some embodiments, some, but not all, of the S-boxes $S_n$ (n=0, 1, ..., N−1) implement the corresponding S-box function $H_n$ written as a composition of a corresponding first function $F_n$, a corresponding second function $G_n$ and a corresponding third function $W_n$ so that $H_n=G_n \circ F_n \circ W_n$, and with the remaining S-boxes implementing the corresponding S-box function $H_n$ written as a composition of a corresponding first function $F_n$ and a corresponding second function $G_n$, so that $H_n=G_n \circ F_n$. Regardless, in the following, the input to the first function $F_n$ is the value $x_n$ (where $x_n=a_n$ or $x_n=W_n(a_n)$ as appropriate) for (n=0, 1, ..., N−1).

In FIG. 4b, a first processing stage is illustrated, which involves determining $F_n(x_n)$ for each n=0, 1, ..., N−1. Additionally, a second processing stage is illustrated, which involves applying the second functions $G_n$ to respective outputs from the first processing stage to determine $G_n(F_n(x_n))$ (n=0, 1, ..., N−1) and then combining these quantities using the linear transformation L, to thereby generate y.

Now, $F_n(x_n)$ (n=0, 1, ..., N−1) may be written, or represented as, a plurality of components (or parts), i.e. $F_n(x_n)=\Sigma_{d=0}^{D_n-1} e_{n,d}$ for components $e_{n,d}$ (d=0, 1, ..., $D_n$−1), where $D_n$ is an integer with $D_n>1$. For example, $F_n(x_n)$ may have a $B_n$-bit representation, i.e. it may be written as a vector of bits in $\mathbb{Z}_2^{B_n}$—then each $e_{n,d}$ may also be a vector in $\mathbb{Z}_2^{B_n}$. For example, $D_n$ could be equal to $B_n$, with $e_{n,d}$ being the vector that has 0 in all elements except for the $d^{th}$ element, which is, instead, equal to the $d^{th}$ bit of $F_n(x_n)$—thus, $F_n(x_n)=\Sigma_{d=0}^{D_n-1} e_{n,d}$. Similarly, $D_n$ could be equal to 2, with $e_{n,0}$ being a vector for which a first subset of elements are 0 and for which the remaining elements equal the corresponding bit-value of $F_n(x_n)$, and with $e_{n,1}$ being a vector for which the first subset of elements equal the corresponding bit-value of $F_n(x_n)$ and the remaining elements are 0. Similarly, $D_n$ could be equal to 2, with $e_{n,0}$ being a random element of $\mathbb{Z}_2^{B_n}$ and with $e_{n,1}=e_{n,0}+F_n(x_n)$ (noting that the addition operator here is equivalent to a bitwise XOR). It will be appreciated that these are merely examples, and that other ways of writing, or representing, $F_n(x_n)$ as a plurality of components (or parts) could be used instead. In some embodiments, $D_{n1}$ is different from $D_{n2}$ for some or all instances in which n1≠n2. Alternatively, in some embodiments, $D_n$ is the same for all n=0, 1, ..., N−1.

As a linear transformation, L may be represented as a matrix $$L = \begin{bmatrix} l_{0,0} & \cdots & l_{0,N-1} \\ \vdots & \ddots & \vdots \\ l_{N-1,0} & \cdots & l_{N-1,N-1} \end{bmatrix},$$

so that the first processing stage and the second processing stage together implement $$y = \begin{bmatrix} l_{0,0} & \cdots & l_{0,N-1} \\ \vdots & \ddots & \vdots \\ l_{N-1,0} & \cdots & l_{N-1,N-1} \end{bmatrix} \begin{bmatrix} G_0(F_0(x_0)) \\ \vdots \\ G_{N-1}(F_{N-1}(x_{N-1})) \end{bmatrix}.$$

It will be appreciated that, in some embodiments, $G_n(F_n(x_n))$ (n=0, 1, ..., N−1) may be represented as $B_n \times 1$ a vector (e.g. a vector from $\mathbb{Z}_2^{B_n}$), in which case each of $l_{q,n}$ (n, q=0, 1, ..., N−1) is a $B_n \times B_n$ matrix. In alternative embodiments, $G_n(F_n(x_n))$ (n=0, 1, ..., N−1) may be represented as an element of a field $\mathcal{F}$, in which case each of $l_{q,n}$ (n, q=0, 1, ..., N−1) may be an element of the field $\mathcal{F}$.

Now:

$$y = \begin{bmatrix} l_{0,0} & \cdots & l_{0,N-1} \\ \vdots & \ddots & \vdots \\ l_{N-1,0} & \cdots & l_{N-1,N-1} \end{bmatrix} \begin{bmatrix} G_0(F_0(x_0)) \\ \vdots \\ G_{N-1}(F_{N-1}(x_{N-1})) \end{bmatrix}$$

$$= \begin{bmatrix} l_{0,0}G_0(F_0(x_0)) + l_{0,1}G_1(F_1(x_1)) + \ldots + l_{0,N-1}G_{N-1}(F_{N-1}(x_{N-1})) \\ \vdots \\ l_{N-1,0}G_0(F_0(x_0)) + l_{N-1,1}G_1(F_1(x_1)) + \ldots + l_{N-1,N-1}G_{N-1}(F_{N-1}(x_{N-1})) \end{bmatrix}$$

$$= \begin{bmatrix} l_{0,0}G_0\left(\sum_{d=0}^{D_0-1} e_{0,d}\right) + l_{0,1}G_1\left(\sum_{d=0}^{D_1-1} e_{1,d}\right) + \ldots + l_{0,N-1}G_{N-1}\left(\sum_{d=0}^{D_{N-1}-1} e_{N-1,d}\right) \\ \vdots \\ l_{N-1,0}G_0\left(\sum_{d=0}^{D_0-1} e_{0,d}\right) + l_{N-1,1}G_1\left(\sum_{d=0}^{D_1-1} e_{1,d}\right) + \ldots + l_{N-1,N-1}G_{N-1}\left(\sum_{d=0}^{D_{N-1}-1} e_{N-1,d}\right) \end{bmatrix}$$

$$= \begin{bmatrix} l_{0,0}G_0 e_{0,0} \\ \vdots \\ l_{N-1,0}G_0 e_{0,0} \end{bmatrix} + \begin{bmatrix} l_{0,0}G_0 e_{0,1} \\ \vdots \\ l_{N-1,0}G_0 e_{0,1} \end{bmatrix} + \ldots + \begin{bmatrix} l_{0,0}G_0 e_{0,D_0-1} \\ \vdots \\ l_{N-1,0}G_0 e_{0,D_0-1} \end{bmatrix} + \begin{bmatrix} l_{0,1}G_1 e_{1,0} \\ \vdots \\ l_{N-1,1}G_1 e_{1,0} \end{bmatrix} + \ldots +$$

$$\begin{bmatrix} l_{0,1}G_1 e_{1,D_1-1} \\ \vdots \\ l_{N-1,1}G_1 e_{1,D_1-1} \end{bmatrix} + \ldots + \begin{bmatrix} l_{0,N-1}G_{N-1} e_{N-1,0} \\ \vdots \\ l_{N-1,N-1}G_{N-1} e_{N-1,0} \end{bmatrix} + \ldots + \begin{bmatrix} l_{0,N-1}G_{N-1} e_{N-1,D_{N-1}-1} \\ \vdots \\ l_{N-1,N-1}G_{N-1} e_{N-1,D_{N-1}-1} \end{bmatrix} + \overline{c}$$

Here, $\overline{c}$ is a constant vector. In particular, if $G_n$ is linear or if $G_n$ is affine and $D_n$ is even, then $G_n(\Sigma_{d=0}^{D_n-1} e_{n,d}) = \Sigma_{d=0}^{D_n-1} G_n e_{n,d}$ and $G_n$ will make no contribution to $\overline{c}$—thus, if this holds for all $G_n$ (n=0, 1, ..., N−1), then $\overline{c}=0$ and $\overline{c}$ can be ignored. Alternatively, if $G_n$ is affine (so that $G_n(x) = \theta x \oplus \omega_n$) and $D_n$ is odd, then $G_n(\Sigma_{d=0}^{D_n-1} e_{n,d}) = \Sigma_{d=0}^{D_n-1} G_n e_{n,d} + \omega_n$, and so $G_n$ will make a contribution of $$\begin{bmatrix} l_{0,n}\omega_n \\ \vdots \\ l_{N-1,n}\omega_n \end{bmatrix}$$

to $\overline{c}$—thus, $\overline{c}$ would be the sum of such contributions. Thus, each component $e_{n,d}$ (n=0, 1, ..., N−1; d=0, 1, ..., $D_n$−1) contributes the vector $$\begin{bmatrix} l_{0,n} G_n e_{n,d} \\ \vdots \\ l_{N-1,n} G_n e_{n,d} \end{bmatrix}$$

to the computation of the amount of data y, with y being the sum of these vector contributions (and potentially with the addition of $\overline{c}$ if $\overline{c} \neq 0$).

The set of components $E = \{e_{n,d}: n=0, 1, \ldots, N-1; d=0, 1, \ldots, D_n-1\}$ may be partitioned into a plurality of disjoint partitions, each having a respective plurality of the components $e_{n,d}$. Let there be M such partitions (for integer M>1), namely $E_m$ (m=0, 1, ..., M−1), where $\cup_{m=0}^{M-1} E_m = E$ and $E_{m1} \cap E_{m2} = \emptyset$ if $m1 \neq m2$. In some embodiments, the partitions have the same number of components; in other embodiments, some or all of the partitions may have different numbers of components from each other. Each partition $E_m$ contributions the vector $$\sum_{e_{n,d} \in E_m} \begin{bmatrix} l_{0,n} G_n e_{n,d} \\ \vdots \\ l_{N-1,n} G_n e_{n,d} \end{bmatrix}$$

to the computation of the amount of data y.

Figure 5:
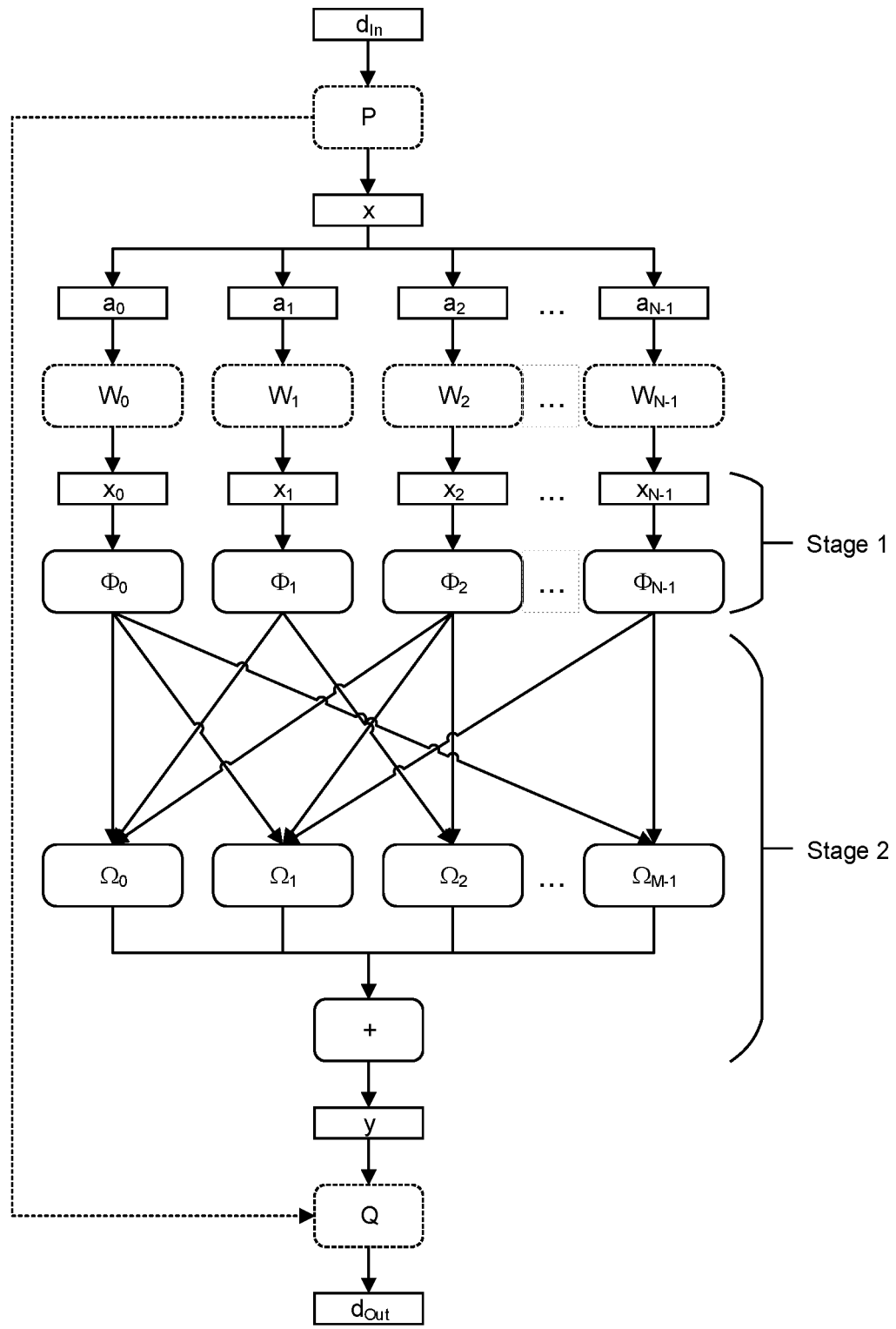
FIG. 5 schematically illustrates an implementation of the cryptographic process of FIGS. 4a and 4b according to embodiments of the invention.

Based on the above, FIG. 5 schematically illustrates an implementation of the cryptographic process of FIGS. 4a and 4b according to embodiments of the invention. In particular, as shall be discussed in more detail below, the first functions $F_n$ (n=0, 1, ..., N−1) are implemented by respective lookup tables $\Phi_n$ (n=0, 1, ..., N−1) (referred to herein as first lookup tables or Type 1 lookup tables) and the second functions $G_n$ (n=0, 1, ..., N−1) together with the linear transformation L are together implemented by a plurality (or network) of lookup tables $\Omega_m$ (m=0, 1, ..., M−1) (referred to herein as second lookup tables or Type 2 lookup tables) with the outputs of the lookup tables $\Omega_m$ (m=0, 1, ..., M−1) combined or summed. In essence, each second lookup tables $\Omega_m$ (m=0, 1, ..., M−1) corresponds to the partition $E_m$—the input to that second lookup table $\Omega_m$ comprises, or is based on, the components $e_{n,d}$ in the partition $E_m$ (or at least a representation thereof), and the corresponding output from the second lookup table $\Omega_m$ is the vector $$\sum_{e_{n,d} \in E_m} \begin{bmatrix} l_{0,n} G_n e_{n,d} \\ \vdots \\ l_{N-1,n} G_n e_{n,d} \end{bmatrix}$$

(or a representation thereof), i.e. the contribution that the partition $E_m$ makes to the computation of y. The outputs from the plurality of second lookup tables $\Omega_m$ (m= 0, 1, ..., M−1) may then be combined (i.e. summed/added) to generate y (and potentially with the addition of $\overline{c}$ if $\overline{c} \neq 0$).

Thus, as can be seen from FIG. 5, performing the cryptographic process comprises performing a first processing stage and a second processing stage to generate the amount of data y based on the amount of data x, wherein:

(a) The first processing stage uses a plurality of first lookup tables $\Phi_n$ (n=0, 1, ..., N−1) to generate respective outputs, each output being based on a part $a_n$ of the amount of data x (insofar as $\Phi_n$ may provide an output corresponding to an input of $a_n$ if the third function $W_n$ is not used, or may provide an output corresponding to an input of $W_n(a_n)$ if the third function $W_n$ is used). For each S-box $S_n$ (n=0, 1, ..., N−1), the respective first function $F_n$ is implemented by a corresponding first lookup table $\Phi_n$ of the first processing stage. Thus, given an input $x_n$, the lookup table $\Phi_n$ provides $F_n(x_n)$ (or a representation or encoding thereof) as an output. As can be seen from the above, the output of each first lookup table may be based on a corresponding portion of bits of the amount of data x.

(b) The second stage combines the outputs from a plurality of second lookup tables $\Omega_m$ (m=0, 1, . . . , M−1) to generate the amount of data y. The input to each second lookup table $\Omega_m$ (m=0, . . . , M−1) is formed from the outputs of a plurality of the first lookup tables $\Phi_n$ (n=0, 1, . . . , N−1). In particular, the input to the second lookup table $\Omega_m$ (m=0, . . . , M−1) comprises, or represents, at least a component (or part) of each of a respective plurality of the first lookup tables $\Phi_n$ (n=0, 1, . . . , N−1). The set of second lookup tables is based on (or implements) the second functions $G_n$ (n=0, 1, . . . , N−1) and the linear transformation L.

In some embodiments, the second stage may be arranged to generate a masked version of the amount of data y. For example, the second stage may be arranged to generate the amount of data $y+\bar{r}$ for some predetermined secret vector/value $\bar{r} \neq 0$. It will be appreciated that the addition of r may be the result of just one of the second lookup tables $\Omega_m$ (m=0, 1, . . . , M−1), or may be the result of a plurality (perhaps all) of the second lookup tables $\Omega_m$ (m=0, 1, . . . , M−1). The masking may then be undone at a later processing stage as appropriate. Indeed, in some embodiments in which $\bar{c} \neq 0$, the second processing stage may be arranged to combine the output of the plurality of second lookup tables $\Omega_m$ (m=0, 1, . . . , M−1) but without the addition of $\bar{c}$, thereby generating the masked version of y, namely $y-\bar{c}$ (i.e. $y+\bar{c}$).

In FIG. 5, a certain configuration of the links of outputs of first lookup tables $\Phi_n$ (n=0, 1, . . . , N−1) with inputs to second lookup tables $\Omega_m$ (m=0, 1, . . . , M−1) (i.e. a certain entanglement) is shown, but it will be appreciated that this is merely one example. Such entanglements between the first lookup tables $\Phi_n$ (n=0, 1, . . . , N−1) and the second lookup tables $\Omega_m$ (m=0, 1, . . . , M−1) helps improve resistance against correlation attacks, such as DCA attacks. The attacker is no longer able to focus on a single S-box—instead, the result of the linear transformation L base on the outputs of the plurality of S-boxes gets generated without an attacker being able to isolate the output of a single S-box. Indeed, the input to a single S-box affects the outputs of multiple second lookup tables $\Omega_m$ (m=0, 1, . . . , M−1), which helps obfuscate any correlation between inputs and outputs. In other words, each bit of input affects more output bits than an conventional implementation, thereby making it harder for the attacker to analyse/attack.

Figure 6:
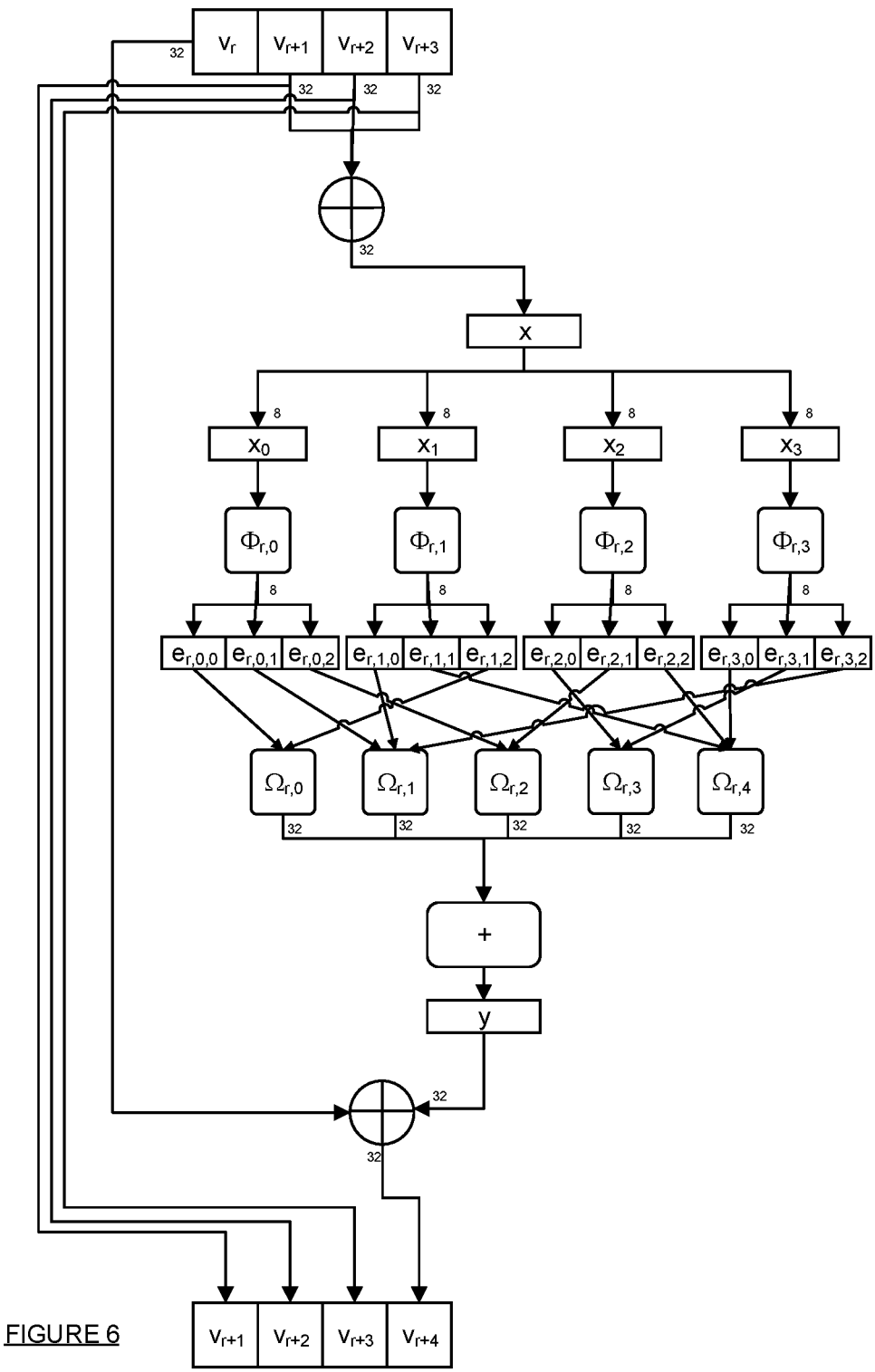
FIG. 6 schematically illustrates the implementation shown in FIG. 5, using SM4 as an example of the cryptographic process.

A specific example of this is set out below, and is illustrated schematically in FIG. 6, based on the SM4 encryption discussed above with respect to FIG. 2b. In this example, N=4 and, for the $r^{th}$ round, the four S-boxes $S_{r,n}$ (n=0, 1, 2, 3) implement the corresponding S-box function $H_{r,n}(x) = (A_2((A_1(x \oplus k_{r,n} \oplus C_1))^{-1}) \oplus C_2$ In this case, one may write $H_{r,n} = G_{r,n} \circ F_{r,n}$, where $F_{r,n}(x) = (A_1(x \oplus k_{r,n} \oplus C_1))^{-1}$ and $G_{r,n}(x) = A_2 x \oplus C_2$.

The 128-bit input to the $r^{th}$ round comprises, or is treated as a concatenation of, four 32-bit quantities (or values): $v_r$, $v_{r+1}$, $v_{r+2}$, $v_{r+3}$. For the first processing stage shown in FIG. 5, the amount of data x is the XOR of $v_{r+1}$, $v_{r+2}$ and $v_{r+3}$ shown in FIG. 2b. Then, $x_{r,n}$ (n=0, 1, 2, 3) is the 8-bit value formed from the block of bits $8n$ to $8n+7$ of x. Thus, for the $r^{th}$ round there will be four respective Type 1 lookup tables $\Phi_{r,n}$ (n=0, 1, 2, 3), with lookup tables $\Phi_{r,n}$ using $x_{r,n}$ as an input and providing $F_{r,n}(x_{r,n})$ (or a representation thereof) as an output.

The outputs $F_{r,n}(x_{r,n})$ from the lookup tables $\Phi_{r,n}$ (n=0, 1, 2, 3) for the $r^{th}$ round are 8-bit values, each of which may be viewed as having three respective components, namely: $e_{r,n,0}$ is the 8-bit value whose 3 most significant bits match those of $F_{r,n}(x_{r,n})$ and whose other bits are 0; $e_{r,n,1}$ is the 8-bit value whose 2 middle bits match those of $F_{r,n}(x_{r,n})$ and whose other bits are 0; and $e_{r,n,2}$ is the 8-bit value whose 3 least significant bits match those of $F_{r,n}(x_{r,n})$ and whose other bits are 0. Thus $F_{r,n}(x_{r,n}) = e_{r,n,0} + e_{r,n,1} + e_{r,n,2}$. Of course, the way in which components are chosen/selected may change from one Type 1 table to another Type 1 table. Likewise, the way in which components are chosen/selected may change from one round to another round.

The set of components $E_r = \{e_{r,n,j}: n=0, \ldots, 3; j=0, 1, 2\}$ could be partitioned in a variety of ways, but suppose that five partitions are used so that M=5, e.g. $E_{r,0} = \{e_{r,0,0}, e_{r,1,2}\}$, $E_{r,1} = \{e_{r,0,1}, e_{r,1,0}, e_{r,3,2}\}$, $E_{r,2} = \{e_{r,0,2}, e_{r,2,1}\}$, $E_{r,3} = \{e_{r,2,0}, e_{r,3,1}\}$ and $E_{r,4} = \{e_{r,1,1}, e_{r,2,2}, e_{r,3,0}\}$. Of course, the way in which components are partitioned may change from one round to another round.

Then, for the $r^{th}$ round there will be five respective Type 2 lookup tables $\Omega_{r,m}$ (m=0, . . . , M−1), where:

(a) The input to $\Omega_{r,0}$ corresponds to, or is based on, $e_{r,0,0}$ and $e_{r,1,2}$ and, therefore, could be a 6-bit value formed from the 3 most significant bits of the output of $\Phi_{r,0}$ and the 3 least significant bits of the output of $\Phi_{r,1}$; the output of $\Omega_{r,0}$ would then be $$\begin{bmatrix} l_{0,0} G_{r,0} e_{r,0,0} \\ l_{1,0} G_{r,0} e_{r,0,0} \\ l_{2,0} G_{r,0} e_{r,0,0} \\ l_{3,0} G_{r,0} e_{r,0,0} \end{bmatrix} + \begin{bmatrix} l_{0,1} G_{r,1} e_{r,1,2} \\ l_{1,1} G_{r,1} e_{r,1,2} \\ l_{2,1} G_{r,1} e_{r,1,2} \\ l_{3,1} G_{r,1} e_{r,1,2} \end{bmatrix}.$$

(b) The input to $\Omega_{r,1}$ corresponds to, or is based on, $e_{r,0,1}$, $e_{r,1,0}$ and $e_{r,3,2}$ and, therefore, could be an 8-bit value formed from the 2 middle bits of the output of $\Phi_{r,0}$, the 3 most significant bits of the output of $\Phi_{r,1}$ and the 3 least significant bits of the output of $\Phi_{r,3}$; the output of $\Omega_{r,1}$ would then be $$\begin{bmatrix} l_{0,0} G_{r,0} e_{r,0,0} \\ l_{1,0} G_{r,0} e_{r,0,0} \\ l_{2,0} G_{r,0} e_{r,0,0} \\ l_{3,0} G_{r,0} e_{r,0,0} \end{bmatrix} + \begin{bmatrix} l_{0,1} G_{r,1} e_{r,1,2} \\ l_{1,1} G_{r,1} e_{r,1,2} \\ l_{2,1} G_{r,1} e_{r,1,2} \\ l_{3,1} G_{r,1} e_{r,1,2} \end{bmatrix} + \begin{bmatrix} l_{0,3} G_{r,3} e_{r,3,2} \\ l_{1,3} G_{r,3} e_{r,3,2} \\ l_{2,3} G_{r,3} e_{r,3,2} \\ l_{3,3} G_{r,3} e_{r,3,2} \end{bmatrix}.$$

(c) The input to $\Omega_{r,2}$ corresponds to, or is based on, $e_{r,0,2}$ and $e_{r,2,1}$ and, therefore, could be a 5-bit value formed from the 3 least significant bits of the output of $\Phi_{r,0}$ and the 2 middle bits of the output of $\Phi_{r,1}$; the output of $\Omega_{r,2}$ would then be $$\begin{bmatrix} l_{0,0} G_{r,0} e_{r,0,2} \\ l_{1,0} G_{r,0} e_{r,0,2} \\ l_{2,0} G_{r,0} e_{r,0,2} \\ l_{3,0} G_{r,0} e_{r,0,2} \end{bmatrix} + \begin{bmatrix} l_{0,2} G_{r,2} e_{r,2,1} \\ l_{1,2} G_{r,2} e_{r,2,1} \\ l_{2,2} G_{r,2} e_{r,2,1} \\ l_{3,2} G_{r,2} e_{r,2,1} \end{bmatrix}.$$

(d) The input to $\Omega_{r,3}$ corresponds to, or is based on, $e_{r,2,0}$ and $e_{r,3,1}$ and, therefore, could be a 5-bit value formed from the 3 most significant bits of the output of $\Phi_{r,2}$ and the 2 middle bits of the output of $\Phi_{r,3}$; the output of $\Omega_{r,3}$ would then be $$\begin{bmatrix} l_{0,2}G_{r,2}e_{r,2,0} \\ l_{1,2}G_{r,2}e_{r,2,0} \\ l_{2,2}G_{r,2}e_{r,2,0} \\ l_{3,2}G_{r,2}e_{r,2,0} \end{bmatrix} + \begin{bmatrix} l_{0,3}G_{r,3}e_{r,3,1} \\ l_{1,3}G_{r,3}e_{r,3,1} \\ l_{2,3}G_{r,3}e_{r,3,1} \\ l_{3,3}G_{r,3}e_{r,3,1} \end{bmatrix}.$$

(e) The input to $\Omega_4$ corresponds to, or is based on, $e_{r,1,1}$, $e_{r,2,2}$ and $e_{r,3,0}$ and, therefore, could be an 8-bit value formed from the 2 middle bits of the output of $\Phi_{r,1}$, the 3 least significant bits of the output of $\Phi_{r,2}$ and the 3 most significant bits of the output of $\Phi_{r,3}$; the output of $\Omega_{r,4}$ would then be $$\begin{bmatrix} l_{0,1}G_{r,1}e_{r,1,1} \\ l_{1,1}G_{r,1}e_{r,1,1} \\ l_{2,1}G_{r,1}e_{r,1,1} \\ l_{3,1}G_{r,1}e_{r,1,1} \end{bmatrix} + \begin{bmatrix} l_{0,2}G_{r,2}e_{r,2,2} \\ l_{1,2}G_{r,2}e_{r,2,2} \\ l_{2,2}G_{r,2}e_{r,2,2} \\ l_{3,2}G_{r,2}e_{r,2,2} \end{bmatrix} + \begin{bmatrix} l_{0,3}G_{r,3}e_{r,3,0} \\ l_{1,3}G_{r,3}e_{r,3,0} \\ l_{2,3}G_{r,3}e_{r,3,0} \\ l_{3,3}G_{r,3}e_{r,3,0} \end{bmatrix}.$$

As mentioned, each S-box $S_n$ (n=0, 1, . . . , N−1) implements a respective function $H_n$ that can be written as either (a) the composition of a respective first function $F_n$ and a respective second function $G_n$ so that $H_n=G_n \circ F_n$, or (b) the composition of a respective first function $F_n$, a respective second function $G_n$ and a respective third function $W_n$ so that $H_n=G_n \circ F_n \circ W_n$. There may be multiple ways of writing $H_n$ as a composition of two or more functions. For example, as discussed above for the SM4 encryption example of FIG. 2b, N=4 and, for the $r^{th}$ round, the four S-boxes $S_{r,n}$ (n=0, 1, 2, 3) implement the corresponding S-box function $H_{r,n}(x)=(A_2((A_1(x \oplus k_{r,n} \oplus C_1))^{-1})) \oplus C_2$, so that one may write $H_{r,n}=G_{r,n} \circ F_{r,n}$, where $F_{r,n}(x)=(A_1(x \oplus k_{r,n} \oplus C_1))^{-1}$ and $G_{r,n}(x)=A_2 x \oplus C_2$. Likewise, for the AES encryption example of FIG. 3b, N=16 and, for the $r^{th}$ round, the sixteen S-boxes $S_{r,n}$ (n=0, 1, 2, 15) implement the corresponding S-box function $H_{r,n}(x)=A_1((x \oplus k_{r-1,n})^{-1})) \oplus C_1$, so that one may write $H_{r,n}=G_{r,n} \circ F_{r,n}$, where $F_{r,n}(x)=(x \oplus k_{r-1,n})^{-1}$ and $G_{r,n}(x)=A_2 x \oplus C_2$. Such formulations for the respective first and second functions $F_n$ and $G_n$ are naturally derived from the S-box function $H_n$. However, given any representation of the S-box function as either (a) the composition of a respective first function $\hat{F}_n$ and a respective second function $\hat{G}_n$ so that $H_n=\hat{G}_n \circ \hat{F}_n$, or (b) the composition of a respective first function $\hat{F}_n$, a respective second function $\hat{G}_n$ and a respective third function $\hat{W}_n$ so that $H_n=\hat{G}_n \circ \hat{F}_n \circ \hat{W}_n$, it is possible to define a respective first function $F_n$ and a respective second function $G_n$ so that $H_n=G_n \circ F_n$, or $H_n=G_n \circ F_n \circ W_n$ as appropriate, where (i) $G_n=(\hat{G}_n \circ T_n^{-1} \circ J_n^{-1})$ and $F_n=(J_n \circ T_n \circ \hat{F}_n)$ or (ii) $G_n=(\hat{G}_n \circ J_n^{-1} \circ T_n^{-1})$ and $F_n=(T_n \circ J_n \circ \hat{F}_n)$ or (iii) $G_n=(\hat{G}_n \circ J_n^{-1})$ and $F_n=(J_n \circ \hat{F}_n)$ or (iv) $G_n=(\hat{G}_n \circ T_n^{-1})$ and $F_n=(T_n \circ \hat{F}_n)$ for invertible functions $T_n$ and $J_n$, as discussed below. In particular, in some embodiments of the invention, the functions $T_n$ (n=0, 1, . . . , N−1) are $B_n$-bit to $B_n$-bit invertible linear transformations and the functions $J_n$ (n=0, 1, . . . , N−1) are one-to-one bit-expansion-functions, in that they map a $B_{n,1}$-bit value to a uniquely corresponding $B_{n,2}$-bit value, where $B_{n,2} > B_{n,1}$. For notation purposes, $J_n^{-1}$ is the function whose domain is the codomain of $J_n$, so that $J_n^{-1}(\alpha)=\beta$ if $\beta$ is a $B_{n,1}$-bit value with $J_n(\beta)=\alpha$. The use of the invertible linear transformations $T_n$ (n=0, 1, . . . , N−1) helps obfuscate the Type 1 and Type 2 tables, whilst the use of the bit-expansion-functions $J_n$ (n=0, 1, . . . , N−1) makes it harder for an attacker since there is a larger apparent dynamic range of values for the attacker to analyse.

The invertible linear transformations $T_n$ (n=0, 1, . . . , N−1) could be any linear transformations and could, for example, be randomly generated. In some embodiments, $T_{n1}$ is different from $T_{n2}$ for some n1≠n2; in other embodiments, $T_n$ is the same for all n=0, 1, . . . , N−1. In embodiments that make use of the invertible linear transformations $T_n$ (n=0, 1, . . . , N−1), the first lookup tables $\Phi_n$ (n=0, 1, . . . , N−1) implement a corresponding obfuscation transformation that is undone by the plurality of second lookup tables $\Omega_m$ (m=0, 1, . . . , M−1).

An example of bit-expansion-function $J_n$ (n=0, 1, . . . , N−1) is as follows. Suppose $B_{n,1}=8$ and $B_{n,2}=12$. If the input to the bit-expansion function $J_n$ is z (as an 8-bit vector or element of $\mathbb{Z}_2^8$), then let $\gamma_0$ and $\gamma_1$ be 4-bit values made from different bits of z, so that z can be reformed from $\gamma_0$ and $\gamma_1$ (e.g. $\gamma_0$ is the value made from the 4 most significant bits of z and $\gamma_1$ is the value made from the 4 least significant bits of z). $J_n$ may generate two 4-bit random numbers $\alpha_1$ and $\beta_1$, and define two 4-bit numbers $\alpha_0$ and $\beta_0$ as $\alpha_0=\gamma_0 \oplus \alpha_1$ and $\beta_0=\gamma_1 \oplus \beta_1$. Then $J_n(z)=(\delta_0, \delta_1, \delta_2)$, i.e. a triple of three 4-bit numbers, where $\delta_0=\alpha_0 \oplus \beta_0$, $\delta_1=\alpha_1 \oplus \beta_1$ and $\delta_2=\alpha_1 \oplus \beta_0$. Here we note that $\gamma_0=\delta_0 \oplus \delta_2$ and $\gamma_1=\delta_1 \oplus \delta_2$, so that $\gamma_0$ and $\gamma_1$ (and hence z) may be recovered from $(\delta_0, \delta_1, \delta_2)$, thereby defining the inverse mapping $J_n^{-1}$ over the codomain of $J_n$. Thus, one could represent $J_n(z)$ with three 12-bit vectors or components, namely $$e_0 = \begin{bmatrix} \delta_0 \\ 0 \\ 0 \end{bmatrix}, e_1 = \begin{bmatrix} 0 \\ \delta_1 \\ 0 \end{bmatrix} \text{ and } e_2 = \begin{bmatrix} 0 \\ 0 \\ \delta_2 \end{bmatrix}$$

(with 0, $\delta_0$, $\delta_1$, $\delta_2$ viewed here as 4-bit vectors), so that $J_n(z)$ (as an 12-bit vector or element of $\mathbb{Z}_2^{12}$) is $J_n(z)=e_0+e_1+e_2$. It will be appreciated, of course, that other bit-expansion functions could be used instead. Regardless, in embodiments that make use of bit-expansion-functions $J_n$ (n=0, 1, . . . , N−1), the outputs of the first lookup tables $\Phi_n$ (n=0, 1, . . . , N−1) have a larger bit width than the inputs to the first lookup tables $\Phi_n$ (n=0, 1, . . . , N−1).

Figure 7:
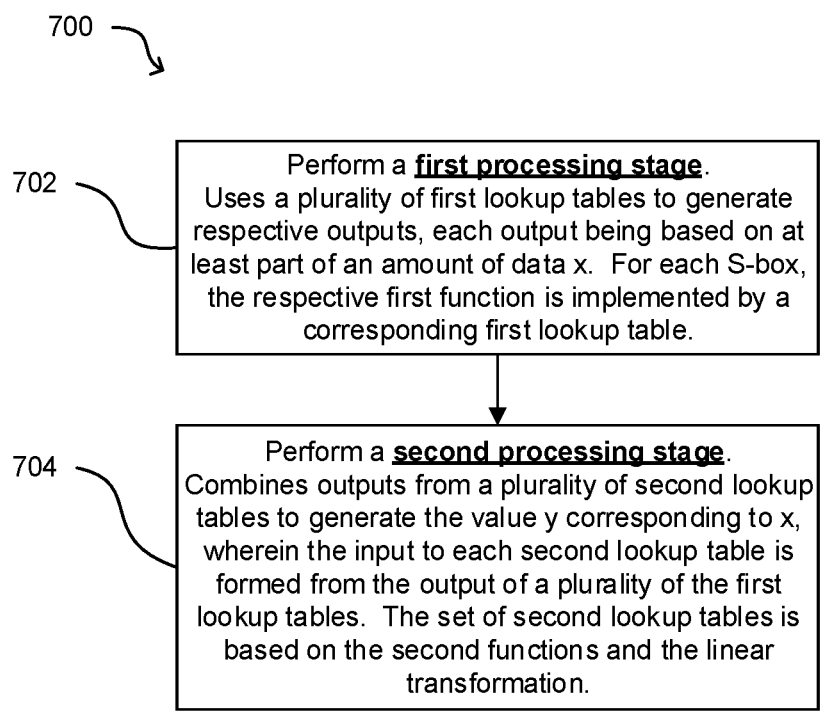
FIG. 7 is a flowchart illustrating a method, according to some embodiments of the invention, for performing a cryptographic process.

FIG. 7 is a flowchart illustrating a method 700, according to some embodiments of the invention, for performing a cryptographic process that generates output data $d_{Out}$ based on input data $d_{In}$. As set out above, generating the output data $d_{Out}$ involves generating a value y based on an amount of data x. The value y represents a combination, according to a linear transformation L, of respective outputs from a plurality of S-boxes $S_n$ (n=0, . . . , N−1) for integer N>1. Each S-box $S_n$ (n=0, . . . , N−1) implements a respective function $H_n$ that is either (a) the composition of a respective first function $F_n$ and a respective linear or affine second function $G_n$ so that $H_n=G_n \circ F_n$, or (b) the composition of a respective first function $F_n$, a respective linear or affine second function $G_n$ and a respective third function $W_n$ so that $H_n=G_n \circ F_n \circ W_n$.

At a step 702, the method 700 comprises performing a first processing stage. The first processing stage uses a plurality of first lookup tables $\Phi_n$ (n=0, 1, . . . , N−1) to generate respective outputs, each output being based on at least part of the amount of data x. For each S-box $S_n$ (n=0, . . . , N−1), the respective first function $F_n$ is implemented by a corresponding first lookup table $\Phi_n$.

At a step 704, the method 700 comprises performing a second processing stage. The second processing stage combines outputs from a plurality of second lookup tables $\Omega_m$ (m=0, 1, . . . , M−1) to generate the value y (and potentially with the addition of $\bar{c}$ if $\bar{c} \neq 0$). The input to each second lookup table $\Omega_m$ (m=0, 1, ..., M−1) is formed from the output of a plurality of the first lookup tables (namely the components $e_{n,d} \in E_m$). The set of second lookup tables is based on the second functions $G_n$ (n=0, ..., N−1) and the linear transformation L.

The first processing stage and the second processing stage generate the value y based on the amount of data x.

Figure 8:
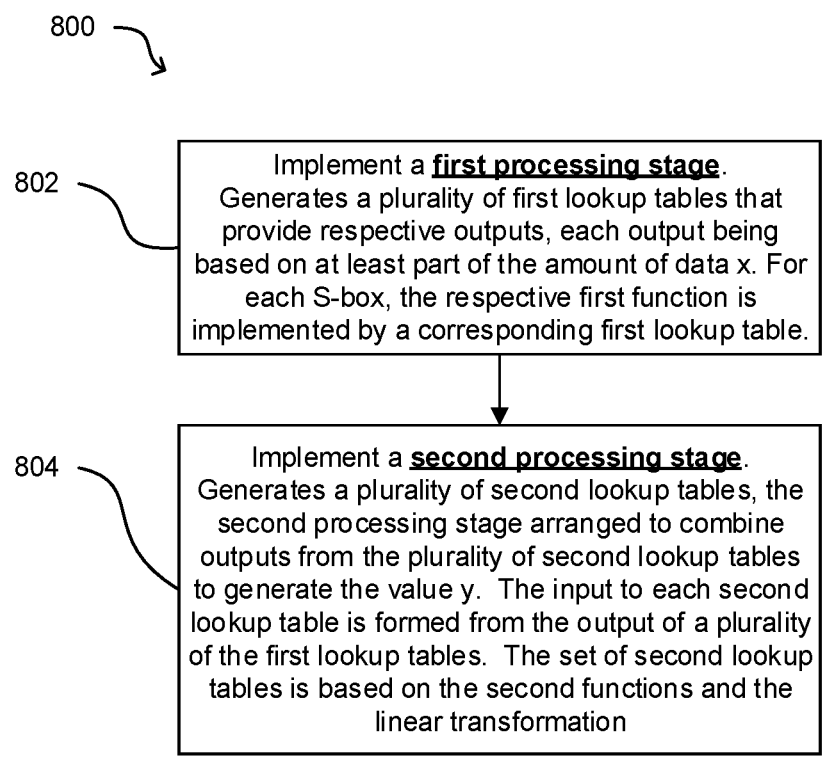
FIG. 8 is a flowchart illustrating a method, according to some embodiments of the invention, for generating a secured implementation of a cryptographic process.

FIG. 8 is a flowchart illustrating a method 800, according to some embodiments of the invention, for generating a secured implementation of a cryptographic process. The cryptographic process itself generates output data $d_{Out}$ based on input data $d_{In}$. As set out above, generating the output data $d_{Out}$ involves generating a value y based on an amount of data x. The value y represents a combination, according to a linear transformation L, of respective outputs from a plurality of S-boxes $S_n$ (n=0, ..., N−1) for integer N>1. Each S-box $S_n$ (n=0, ..., N−1) implements a respective function $H_n$ that is either (a) the composition of a respective first function $F_n$ and a respective linear or affine second function $G_n$ so that $H_n = G_n \circ F_n$, or (b) the composition of a respective first function $F_n$, a respective linear or affine second function $G_n$ and a respective third function $W_n$ so that $H_n = G_n \circ F_n \circ W_n$.

At a step 802, the method 800 comprises implementing a first processing stage. This involves generating a plurality of first lookup tables $\Phi_n$ (n=0, 1, ..., N−1) that provide respective outputs, each output being based on at least part of the amount of data x. For each S-box $S_n$ (n=0, ..., N−1), the respective first function $F_n$ is implemented by a corresponding first lookup table $\Phi_n$.

At a step 804, the method 800 comprises performing a second processing stage. This involves generating a plurality of second lookup tables $\Omega_m$ (m=0, 1, ..., M−1). The second processing stage is arranged or configured to combine outputs from the plurality of second lookup tables $\Omega_m$ (m=0, 1, ..., M−1) to generate the value y. The input to each second lookup table $\Omega_m$ (m=0, 1, ..., M−1) is formed from the output of a plurality of the first lookup tables (namely the components $e_{n,d} \in E_m$). The set of second lookup tables is based on the second functions $G_n$ (n=0, ..., N−1) and the linear transformation L.

The first processing stage and the second processing stage, together, are arranged to generate the value y based on the amount of data x.

4—Modifications

It will be appreciated that the methods described have been shown as individual steps carried out in a specific order. However, the skilled person will appreciate that these steps may be combined or carried out in a different order whilst still achieving the desired result.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Embodiments of the invention may be carried out on any suitable data processing device, such as a personal computer, laptop, personal digital assistant, mobile telephone, set top box, television, server computer, etc. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or one or more graphical processing units (GPUs), and/or other hardware arrangements. Method steps implemented in flowcharts contained herein, or as described above, may each be implemented by corresponding respective modules; multiple method steps implemented in flowcharts contained herein, or as described above, may be implemented together by a single module.

It will be appreciated that, insofar as embodiments of the invention are implemented by a computer program, then one or more storage media and/or one or more transmission media storing or carrying the computer program form aspects of the invention. The computer program may have one or more program instructions, or program code, which, when executed by one or more processors (or one or more computers), carries out an embodiment of the invention. The term "program" as used herein, may be a sequence of instructions designed for execution on a computer system, and may include a subroutine, a function, a procedure, a module, an object method, an object implementation, an executable application, an applet, a servlet, source code, object code, byte code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

The invention claimed is:

1. A method of performing a cryptographic process in a secured manner, wherein the cryptographic process generates output data based on input data, the generating of the output data involving generating a cryptographically processed data structure comprising a value y based on an initial data structure comprising an amount of data x, the cryptographically processed data structure comprising the value y representing a combination, according to a linear transformation L, of respective outputs from a plurality of S-boxes $S_n$ (n=0, ..., N−1) for integer N>1, wherein each S-box $S_n$ (n=0, ..., N−1) implements a respective function $H_n$ that is either (a) the composition of a respective first function $F_n$ and a respective linear or affine second function $G_n$ so that $H_n = G_n \circ F_n$, or (b) the composition of a respective first function $F_n$, a respective linear or affine second function $G_n$ and a respective third function $W_n$ so that $H_n = G_n \circ F_n \circ W_n$, wherein the method comprises:

performing a first processing stage and a second processing stage to generate the cryptographically processed data structure comprising the value y based on the initial data structure comprising the amount of data x, wherein:

the first processing stage uses a plurality of first lookup tables to generate respective outputs, each output being based on at least part of the amount of data x, wherein, for each S-box $S_n (n=0, \ldots, N-1)$, the respective first function $F_n$ is implemented by a corresponding first lookup table; and the second processing stage combines outputs from a plurality of second lookup tables to generate the cryptographically processed data structure comprising the value y, wherein the input to each second lookup table is formed from the output of a plurality of the first lookup tables, and wherein the set of second lookup tables is based on the second functions $G_n$ $(n=0, \ldots, N-1)$ and the linear transformation L.

2. A method of generating a secured implementation of a cryptographic process, wherein the cryptographic process generates output data based on input data, the generating of the output data involving generating a cryptographically processed data structure comprising a value y based on an initial data structure comprising an amount of data x, the cryptographically processed data structure comprising the value y representing a combination, according to a linear transformation L, of respective outputs from a plurality of S-boxes $S_n$ $(n=0, \ldots, N-1)$ for integer $N>1$, wherein each S-box $S_n$ $(n=0, \ldots, N-1)$ implements a respective function $H_n$ that is either (a) the composition of a respective first function $F_n$ and a respective linear or affine second function $G_n$ so that $H_n = G_n \circ F_n$, or (b) the composition of a respective first function $F_n$, a respective linear or affine second function $G_n$ and a respective third function $W_n$ so that $H_n = G_n \circ F_n \circ W_n$, wherein the method comprises:

implementing a first processing stage and a second processing stage that, together, are arranged to generate the cryptographically processed data structure comprising the value y based on the initial data structure comprising the amount of data x, wherein:

implementing the first processing stage comprises generating a plurality of first lookup tables that provide respective outputs, each output being based on at least part of the amount of data x, wherein, for each S-box $S_n$ $(n=0, \ldots, N-1)$, the respective first function $F_n$ is implemented by a corresponding first lookup table; and implementing the second processing stage comprises generating a plurality of second lookup tables, the second processing stage arranged to combine outputs from the plurality of second lookup tables to generate the cryptographically processed data structure comprising the value y, wherein the input to each second lookup table is formed from the output of a plurality of the first lookup tables, and wherein the set of second lookup tables is based on the second functions $G_n$ $(n=0, \ldots, N-1)$ and the linear transformation L.

3. The method of claim 1, wherein the outputs of the first lookup tables have a larger bit width than the inputs to the first lookup tables.

4. The method of claim 1, wherein the first lookup tables implement a corresponding obfuscation transformation that is undone by the plurality of second lookup tables.

5. The method of claim 1, wherein the output of each first lookup table being based on at least part of the amount of data x comprises the output of each first lookup table being based on a corresponding portion of bits of the amount of data x.

6. The method of claim 1, wherein the output of each first lookup table comprises the sum of a respective plurality of components, and wherein the input to each second lookup table is formed from one or more respective components of each of said plurality of the first lookup tables.

7. A system comprising at least one computer hardware processor arranged to perform a cryptographic process in a secured manner, wherein the cryptographic process generates output data based on input data, the generating of the output data involving generating a cryptographically processed data structure comprising a value y based on an initial data structure comprising an amount of data x, the cryptographically processed data structure comprising the value y representing a combination, according to a linear transformation L, of respective outputs from a plurality of S-boxes $S_n$ $(n=0, \ldots, N-1)$ for integer $N>1$, wherein each S-box $S_n$ $(n=0, \ldots, N-1)$ implements a respective function $H_n$ that is either (a) the composition of a respective first function $F_n$ and a respective linear or affine second function $G_n$ so that $H_n = G_n \circ F_n$, or (b) the composition of a respective first function $F_n$, a respective linear or affine second function $G_n$ and a respective third function $W_n$ so that $H_n = G_n \circ F_n \circ W_n$, wherein the system comprises one or more processors configure to:

perform a first processing stage and a second processing stage to generate the cryptographically processed data structure comprising the value y based on the initial data structure comprising the amount of data x, wherein:

the first processing stage uses a plurality of first lookup tables to generate respective outputs, each output being based on at least part of the amount of data x, wherein, for each S-box $S_n$ $(n=0, \ldots, N-1)$, the respective first function $F_n$ is implemented by a corresponding first lookup table; and the second processing stage combines outputs from a plurality of second lookup tables to generate the cryptographically processed data structure comprising the value y, wherein the input to each second lookup table is formed from the output of a plurality of the first lookup tables, and wherein the set of second lookup tables is based on the second functions $G_n$ $(n=0, \ldots, N-1)$ and the linear transformation L.

8. A system comprising at least one computer hardware processor arranged to generate a secured implementation of a cryptographic process, wherein the cryptographic process generates output data based on input data, the generating of the output data involving generating a cryptographically processed data structure comprising a value y based on an initial data structure comprising an amount of data x, the cryptographically processed data structure comprising the value y representing a combination, according to a linear transformation L, of respective outputs from a plurality of S-boxes $S_n$ $(n=0, \ldots, N-1)$ for integer $N>1$, wherein each S-box $S_n$ $(n=0, \ldots, N-1)$ implements a respective function $H_n$ that is either (a) the composition of a respective first function $F_n$ and a respective linear or affine second function $G_n$ so that $H_n = G_n \circ F_n$, or (b) the composition of a respective first function $F_n$, a respective linear or affine second function $G_n$ and a respective third function $W_n$ so that $H_n = G_n \circ F_n \circ W_n$, wherein the system comprises one or more processors arranged to:

implement a first processing stage and a second processing stage that, together, are arranged to generate the cryptographically processed data structure comprising the value y based on the initial data structure comprising the amount of data x, wherein:

implementing the first processing stage comprises generating a plurality of first lookup tables that provide respective outputs, each output being based on at least part of the amount of data x, wherein, for each S-box $S_n$ (n=0, ..., N−1), the respective first function $F_n$ is implemented by a corresponding first lookup table; and implementing the second processing stage comprises generating a plurality of second lookup tables, the second processing stage arranged to combine outputs from the plurality of second lookup tables to generate the cryptographically processed data structure comprising the value y, wherein the input to each second lookup table is formed from the output of a plurality of the first lookup tables, and wherein the set of second lookup tables is based on the second functions $G_n$ (n=0, ..., N−1) and the linear transformation L.

9. The system of claim 7, wherein the outputs of the first lookup tables have a larger bit width than the inputs to the first lookup tables.

10. The system of claim 7, wherein the first lookup tables implement a corresponding obfuscation transformation that is undone by the plurality of second lookup tables.

11. The system of claim 7, wherein the output of each first lookup table being based on at least part of the amount of data x comprises the output of each first lookup table being based on a corresponding portion of bits of the amount of data x.

12. The system of claim 7, wherein the output of each first lookup table comprises the sum of a respective plurality of components, and wherein the input to each second lookup table is formed from one or more respective components of each of said plurality of the first lookup tables.

13. The method of claim 2, wherein the outputs of the first lookup tables have a larger bit width than the inputs to the first lookup tables.

14. The method of claim 2, wherein the first lookup tables implement a corresponding obfuscation transformation that is undone by the plurality of second lookup tables.

15. The method of claim 2 wherein the output of each first lookup table being based on at least part of the amount of data x comprises the output of each first lookup table being based on a corresponding portion of bits of the amount of data x.

16. The method of claim 2, wherein the output of each first lookup table comprises the sum of a respective plurality of components, and wherein the input to each second lookup table is formed from one or more respective components of each of said plurality of the first lookup tables.

17. The system of claim 8, wherein the outputs of the first lookup tables have a larger bit width than the inputs to the first lookup tables.

18. The system of claim 8, wherein the first lookup tables implement a corresponding obfuscation transformation that is undone by the plurality of second lookup tables.

19. The system of claim 8, wherein the output of each first lookup table being based on at least part of the amount of data x comprises the output of each first lookup table being based on a corresponding portion of bits of the amount of data x.

20. The system of claim 8, wherein the output of each first lookup table comprises the sum of a respective plurality of components, and wherein the input to each second lookup table is formed from one or more respective components of each of said plurality of the first lookup tables.

\* \* \* \* \*